(12) United States Patent
Shottan et al.

(10) Patent No.: US 9,858,600 B2
(45) Date of Patent: Jan. 2, 2018

(54) UNIVERSAL TAG FOR PAGE ANALYTICS AND CAMPAIGN CREATION

(71) Applicant: TURN INC., Redwood City, CA (US)

(72) Inventors: Jonathan Shottan, San Francisco, CA (US); Vishal Shah, Saratoga, CA (US); Kunal Deshpande, San Francisco, CA (US); Doug Smith, Orinda, CA (US); Tri Pham, San Jose, CA (US)

(73) Assignee: Turn Inc., Redwood City, CA (US)

( * ) Notice: Subject to any disclaimer, the term of this patent is extended or adjusted under 35 U.S.C. 154(b) by 15 days.

(21) Appl. No.: 13/924,263

(22) Filed: Jun. 21, 2013

(65) Prior Publication Data

US 2014/0278748 A1    Sep. 18, 2014

Related U.S. Application Data

(60) Provisional application No. 61/801,001, filed on Mar. 15, 2013.

(51) Int. Cl.

| | |
|---|---|
| *G06Q 10/10* | (2012.01) |
| *G06Q 30/02* | (2012.01) |
| *G06F 17/30* | (2006.01) |
| *G06N 5/02* | (2006.01) |
| *G06F 3/0484* | (2013.01) |

(Continued)

(52) U.S. Cl.
CPC ....... *G06Q 30/0269* (2013.01); *G06F 3/0484* (2013.01); *G06F 17/3089* (2013.01); *G06N 5/02* (2013.01); *G06Q 30/0201* (2013.01); *G06Q 30/0277* (2013.01); *G06F 3/0482* (2013.01); *G06F 17/218* (2013.01); *G06F 17/2241* (2013.01)

(58) Field of Classification Search
CPC ......... G06Q 10/10; G06Q 30/02; G06F 17/30
USPC ........................................ 705/7, 10, 14, 7.29
See application file for complete search history.

(56) References Cited

U.S. PATENT DOCUMENTS

2006/0282328 A1* 12/2006 Gerace et al. .................. 705/14
2009/0037355 A1*  2/2009 Brave et al. .................... 706/45

(Continued)

OTHER PUBLICATIONS

"Hadoop, Open Source Implementation of MapReduce", retrieved online on Jun. 11, 2013 from url: http://hadoop.apache.org, copyright 2012, 4 pages.

(Continued)

*Primary Examiner* — Nga B Nguyen
(74) *Attorney, Agent, or Firm* — Kwan & Olynick, LLP

(57) ABSTRACT

A system for creating and using a universal tag to gather consumer data from a website for the purposes of targeted advertising is provided. The universal tag system has two main subsystems. The first subsystem is a configuration system that is used to define the consumer data to be collected from the website and to define taxonomy and transformation rules to be applied to the collected consumer data. The second subsystem is a runtime system that runs a universal tag client-side script, which is triggered when a consumer lands on a webpage of the website, for collecting the defined consumer data. The runtime system then applies the transformation rules to the collected data and updates a user profile corresponding to the consumer with the transformed data. As well, the runtime system applies the taxonomy rules to the collected data and categorizes the consumer for the purposes of subsequent targeted advertising.

16 Claims, 33 Drawing Sheets

(51) Int. Cl.
*G06F 3/0482* (2013.01)
*G06F 17/21* (2006.01)
*G06F 17/22* (2006.01)

(56) References Cited

U.S. PATENT DOCUMENTS

| | | | | |
|---|---|---|---|---|
| 2009/0076887 A1* | 3/2009 | Spivack et al. | ............. | 705/10 |
| 2009/0240586 A1* | 9/2009 | Ramer et al. | ............. | 705/14 |
| 2010/0205024 A1* | 8/2010 | Shachar et al. | ............. | 705/7 |
| 2011/0271175 A1* | 11/2011 | Lavi | ............. | G06F 17/30905 715/234 |
| 2013/0073401 A1* | 3/2013 | Cook | ............. | G06Q 30/02 705/14.73 |
| 2014/0129534 A1* | 5/2014 | Riley | ............. | G06F 17/30864 707/706 |

OTHER PUBLICATIONS

"Project Voldemort A distributed database", retrieved on Jun. 11, 2013 from url: http://www.project-voldemort.com/voldemort, undated, 1 page.

"Trevni: A Column File Format", retrieved online on Jun. 11, 2013 from url: http://avro.apache.org/docs/current/trevni/spec.html;, copyright 2009-2013, 6 pages.

Ailamaki, et al., "Weaving Relations for Cache Performance", Proceedings of the 27th International Conference on Very Large Data Bases; Roma, Italy, Sep. 11-14, 2001, 12 pages.

Chen, S., "Cheetah: A high performance, custom data warehouse on top of mapreduce", 36th International Conference on Very Large Data Bases; 3(2); Singapore, Sep. 2010, pp. 1459-1468.

Decandia, G. et al., "Dynamo: Amazon's highly available key-value store", 21st ACM Symposium on Operating Systems Principles; Stevenson, Washington, Oct. 2007, pp. 205-220.

Lee, K.C. et al., "Estimating Conversion Rate in Display Advertising from Past Performance Data", 18th ACM SIGKDD Conference on Knowledge Discovery and Data Mining; Beijing, China, Aug. 2012, pp. 768-776.

Melnik, S. et al., "Dremel: Interactive analysis of web-scale datasets", 36th International Conference on Very Large Data Bases; 3(1); Singapore, Sep. 2010, pp. 330-339.

Metwally, A. et al., "Efficient computation of frequent and top-k elements in data streams", Proceedings of the 10th International Conference on Database Theory; Edinburgh, United Kingdom, Jan. 2005, pp. 398-412.

Shao, X. et al., "Data-driven Multi-touch Attribution Models", 17th ACM SIGKDD Conference on Knowledge Discovery and Data Mining; San Diego, California, Aug. 2011, pp. 258-264.

\* cited by examiner

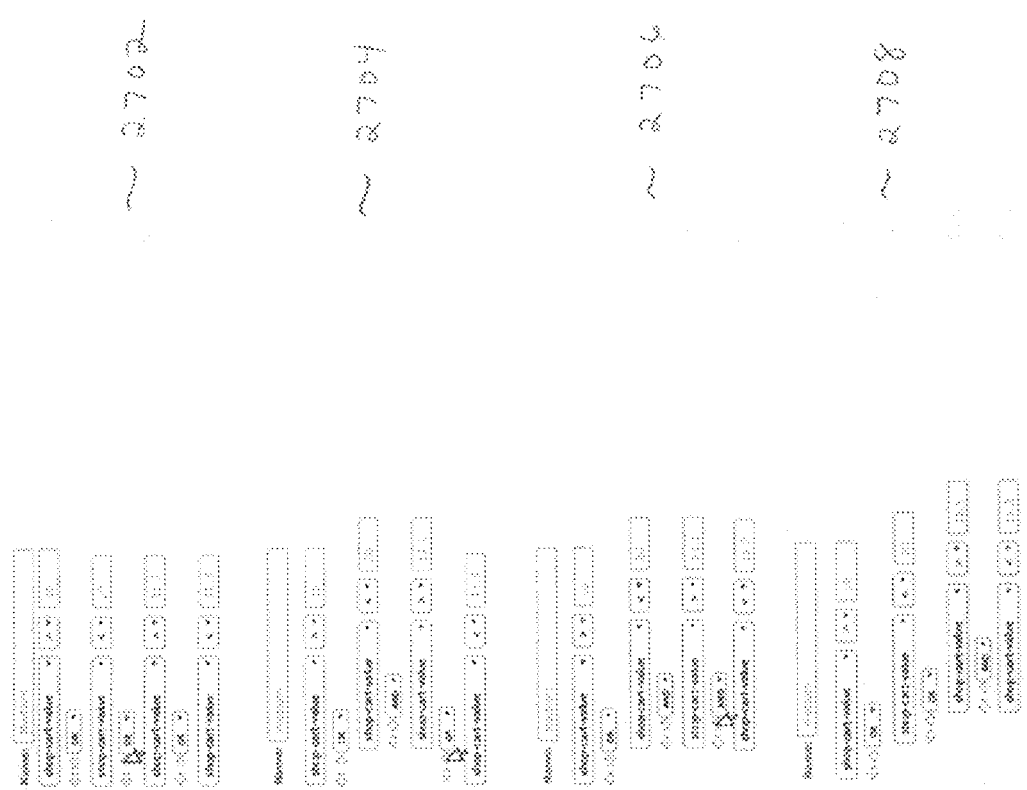

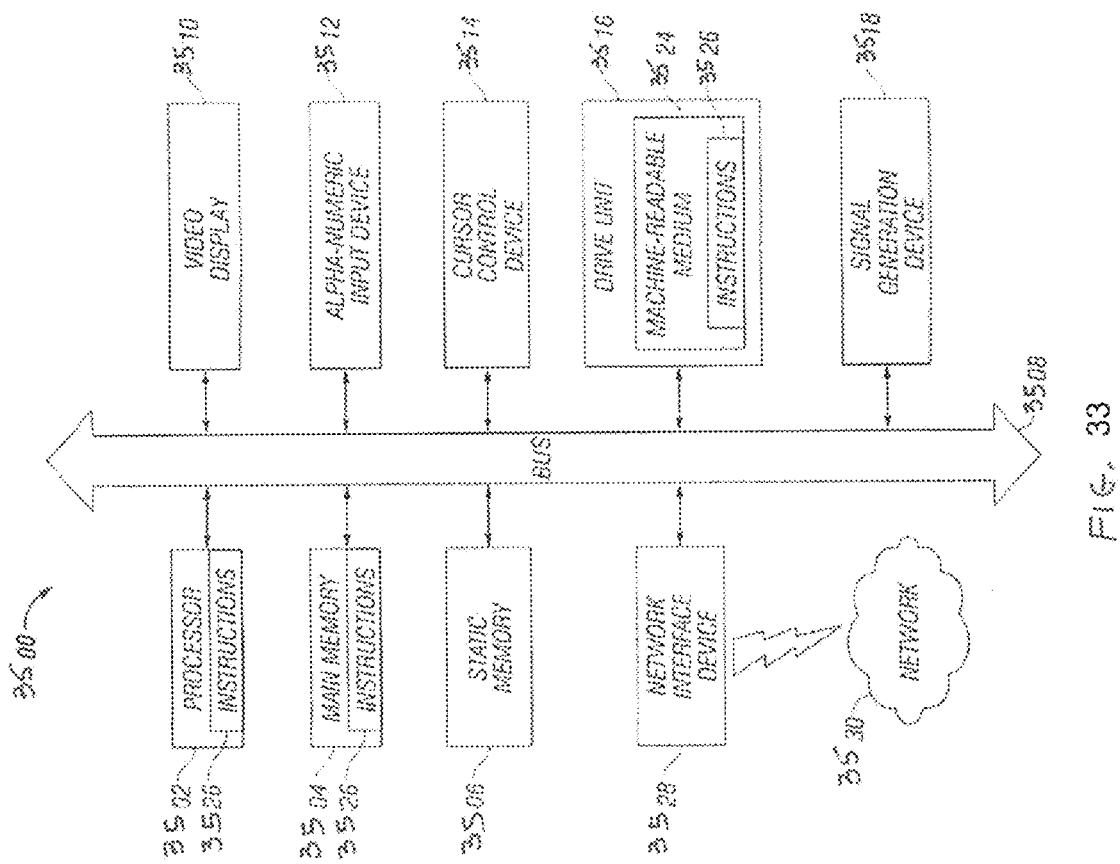

UNIVERSAL TAG FOR PAGE ANALYTICS AND CAMPAIGN CREATION

CROSS REFERENCE TO RELATED APPLICATIONS

This application claims priority to U.S. provisional patent application Ser. No. 61/801,001, filed Mar. 22, 2013, which application is incorporated herein in its entirety by this reference thereto.

BACKGROUND OF THE INVENTION

Technical Field

This invention relates generally to digital advertising. More particularly, this invention relates to a tool for creating and using a universal tag to gather consumer data for the purposes of digital advertising.

Description of the Related Art

The Internet has become a primary source for providing media and information. For example, it is believed that more news articles are read online than in print. Videos and television shows are increasingly viewed through online applications, such as by the companies, Hulu, Netflix, and YouTube. Many of these online media companies earn revenue by allowing advertisers to advertise on their websites. The need of companies with online presence to generate revenue by selling advertising space on their websites is met with the need of advertisers to reach consumers via online advertising. This mutual need has led to the development of a niche industry, online display advertising. Thus, from the advertisers' point of view, it is an important aspect of their business to optimize their digital advertising potential on the Internet.

Although the system of advertising in print media has been well established for centuries, the rules for online advertising are still evolving. As users demand instant access to entertainment their patience for advertisements rapidly dwindles. For example, if a user is forced to view a pre-roll advertisement before a video is displayed, the user may simply click on another window or walk away from the display screen untill the advertisement is gone. Thus, such user is not watching the advertisement. If the user is not watching the advertisement, the advertiser is not receiving the optimal return on their advertisement.

Various innovations with regard to Internet-based advertising have addressed some of these concerns. See, for example, U.S. patent application Ser. No. 12/617,590, Segment Optimization for Targeted Advertising and U.S. patent application Ser. No. 12/410,400, Predicting User Response to Advertisements, each of which is commonly owned by the assignee of this application, and each of which is incorporated herein in its entirety by this reference thereto.

It has been found that advertiser interaction with the data elements of the advertiser's webpage may be helpful for the advertiser. For example, an advertiser may want determine the behavior of the end user by observing the areas of the website with which the user interacts. Thus, an advertiser may want to add code to the advertiser's webpage to collect such behavior information. Tag management is a technique that has been employed to allow adding code to the advertiser's webpage. Tag management is a technique that adds code to an advertiser's webpage by eliminating the need for advertisers to modify code on each individual webpage and by allowing marketers, as opposed to information technologists of an IT department, to control the content on the webpage that should be observed. Tag management basically operates by causing a website, when opened in a browser, to deploy a generic piece of code, such that when the code executes, data is dynamically collected from that website based on predetermined rules.

SUMMARY OF THE INVENTION

A system for creating and using a universal tag to gather consumer data from a website and for analyzing the gathered consumer data is provided. An embodiment of the invention provides a universal tag system that has two main subsystems. The first subsystem is a configuration system that is used to define the consumer data to be collected from the website and to define taxonomy and transformation rules to be applied to the collected consumer data. The second subsystem is a runtime system that runs a universal tag client-side script, which is triggered when a consumer lands on a webpage of the website, and that is used for collecting the defined consumer data. The runtime system then applies the transformation rules to the collected data and updates a user profile of the consumer with the transformed data. As well, the runtime system applies the taxonomy rules to the collected data and categorizes the consumer for the purpose of subsequent targeted advertising.

BRIEF DESCRIPTION OF THE DRAWINGS

FIG. 27 shows four user interfaces having variations on user-created groups by indenting rules according to an embodiment of the invention;

FIG. 33 is a block schematic diagram of a system in the exemplary form of a computer system according to an embodiment of the invention.

DETAILED DESCRIPTION OF THE INVENTION

Figure 1:
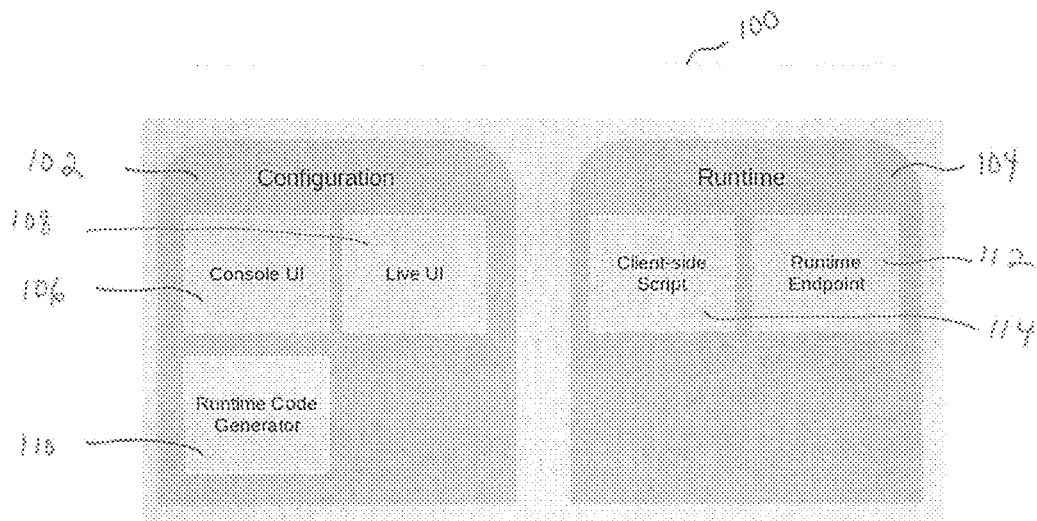
FIG. 1 is a schematic diagram showing components of a configuration subsystem and a runtime subsystem of a universal tag system according to an embodiment.

A system for creating and using a universal tag to gather consumer data from a website and for analyzing the gathered consumer data is provided. An embodiment of the invention provides a universal tag system that has two main subsystems. The first subsystem is a configuration system that is used to define the consumer data to be collected from the website and to define taxonomy and transformation rules to be applied to the collected consumer data. The second subsystem is a runtime system that runs a universal tag client-side script, which is triggered when a consumer lands on a webpage of the website, and that is used for collecting the defined consumer data. The runtime system then applies the transformation rules to the collected data and updates a user profile of the consumer with the transformed data. As well, the runtime system applies the taxonomy rules to the collected data and categorizes the consumer for the purpose of subsequent targeted advertising.

Overview

In an embodiment, generic JavaScript code, which may be referred to in the industry as a pixel of code, is placed on one or more pages of a particular website and, thereafter, is executed to collect predefined data from the website when the website pages load. Such code allows a user, e.g. an advertiser, to select and capture particular events that occur on the website. For example, user interface events ("events") occur when a user interacts with the user interface (UI.) Examples of an event may include, but are not limited to, a user clicking on a mouse, the cursor hovering over a user interface element, the loading of a webpage, changing an input field, and so on. In the embodiment, data resulting from events are captured, stored, and transformed in real-time. Then, the stored data are analyzed and used for generating targeted segments, also referred to as audience creation. For example, a particular audience may be created by applying a set of rules against particular data caused by particular occurring events on a particular website. The created audience may then be used as target segments for an advertiser.

As an example, suppose a user clicks on a shopping cart submission on a particular advertiser's webpage. In the example, the event is the user clicking on the shopping cart submission. Suppose that the shopping cart included a mobile device. Thus, in an embodiment, data reflecting that a particular customer bought the mobile device are gathered and used for targeted advertising to that particular customer. As another example, the advertiser may want to target customers who purchased mobile devices based upon a different, yet related, advertisement.

In an embodiment, a console tool with a user interface is provided to be used in conjunction with the advertiser's website. The console allows a user to generate the code that is placed on the particular website for capturing particular data. The code is referred to herein as a universal tag.

Consider the example in which a shopping cart for a particular website is submitted. Suppose this shopping cart has two products, each with an associated price value and a total price value for both items. In an embodiment, the universal tag on the website causes a set of configured rules to be applied against predefined events that cause the total price value to be captured. For example, suppose that the webpage has a JavaScript variable called shopping_cart. In the example, when the shopping cart is submitted and the subsequent page loads, the value associated with the shopping cart variable is captured and is found to be $219. Further in the example, the system determines, based on predefined taxonomy rules, that the shopping cart value is greater than a threshold, e.g. $150, and that therefore, the category in which this particular cart is placed is a high-end category, as opposed to a medium-end or low-end category. Then, upon determining that this customer is in the high-end category, the system, having been previously configured, further advertises to this customer in a targeted way.

In an embodiment, a user, such as a marketer, logs into the console to begin configuring the universal tag and rules so that consumer data may be collected from a website of interest, e.g. an advertiser's website. The user selects a bookmarklet that is provided on the console user interface, e.g. by clicking or dragging and dropping the bookmarklet onto the bookmark bar of the browser. The bookmarklet contains JavaScript code that is used to select the data to be retrieved; the console is used to create the universal tag and to configure the rules. By selecting such bookmarklet, an application essentially is injected into the website. Upon the bookmarklet being selected, the application displays a window, e.g. an overlaying panel that describes the unique user interface elements that reside on the particular webpage of the advertiser's website. The user may interact with the webpage and with this panel at the same time to select and interact dynamically with the objects on the webpage in which they are interested.

In an embodiment, the end user may manually scroll through a list of objects, e.g. UI elements, in the panel as well as search for objects. Or, the user may use a mouse to interact with a particular object. For example, the user may use the mouse to cause the display cursor to hover over an object, which causes updates to be presented to the end user. The updates may include historical data which were previously collected across all segments from the same demographic, for example. The user may select such object as an object of interest.

In an embodiment, the user can build objects as a generic set of objects of interest from which data can be collected. Such generic set of objects resides in one universal tag that the user may then deploy across all of the webpages of interest. Deploying the one universal tag causes data about such objects to be automatically collected and submitted to a repository, such as an ad server, for subsequent post-processing, such as but not limited to analysis and audience creation.

In an embodiment, analytics are applied directly on a website page. For example, when a marketer arrives at a particular advertiser's website, the universal tag, which resides at the page, is executed. When the universal tag is executed, it allows the marketer to perform analytics on the page with the data that was collected for each of the objects specified in the universal tag.

In an embodiment, indicators, e.g. gear icons, may be displayed next to objects when the user navigates to the webpage to indicate that data are being collected for those objects. As well, the indicators may be linked to historical data about the objects. For example, when an end user uses a mouse to place the display cursor over one of such objects, the embodiment causes the system to present historical data about the object. In this way, the user can go to the location where that data were collected. The user does not have to go to a separate summary or data report to access related data corresponding to a particular object. The data are brought to the user. As an example, a user logs into a webpage, sees the gear icons that indicate what the user had instrumented with his universal tag, and mouse-overs a particular gear to get a report about the corresponding object on the webpage.

An embodiment provides site analytics. As an example, suppose a marketer created a list of products that were being targeted in the advertising campaign. The embodiment allows the marketer to color code the products with respect to various criteria. Thus, for example, the marketer may learn from the color coded list of products, in combination with the site analytics that apply the criteria, that "these products drove the most ROI in my advertising campaign, because given the color, I know that these products drove high conversion rates." That is, an embodiment links information from the advertiser's site to the results obtained on the advertising side and thus closes the loop. Analytics provided in an advertising platform are made available in the console, thus allowing marketer to extract the analytics and place the analytics where the analytics are most relevant, i.e. next to the data that drives them.

Ultimately, the marketer may actually create an advertising campaign dynamically from the console using the universal tag and corresponding rules. The user may say, "Here's the data I'm collecting. I see I've collected ten million users' worth of data. Now with a single click, I may go find those users and target them with a campaign." The process is driven from the advertiser's site, as opposed to the user having to navigate to a different application, such as a service's console, to perform such process.

An Exemplary Universal Tag System

Overview

An embodiment can be understood with reference to FIG. 1, a schematic diagram showing components of a configuration subsystem 102 and a runtime subsystem 104 of a universal tag system 100 ("system.") In an embodiment, configuration subsystem 102 defines which data a universal tag script should collect and how the data should be used in the ad servers, e.g. by allowing rules about the data to be configured. Runtime subsystem 104 runs the universal tag script, collects the data, and feeds the data to ad servers for storage and any post-processing.

In an embodiment, components of configuration subsystem 102 comprise but are not limited to a console UI 106, a UI for collecting live data (also referred to herein as Event Inspector) 108, and a runtime code generator 110. In an embodiment, components of runtime subsystem 104 comprise but are not limited to a client-side script 114 and a runtime endpoint 112.

Data Model

Figure 2:
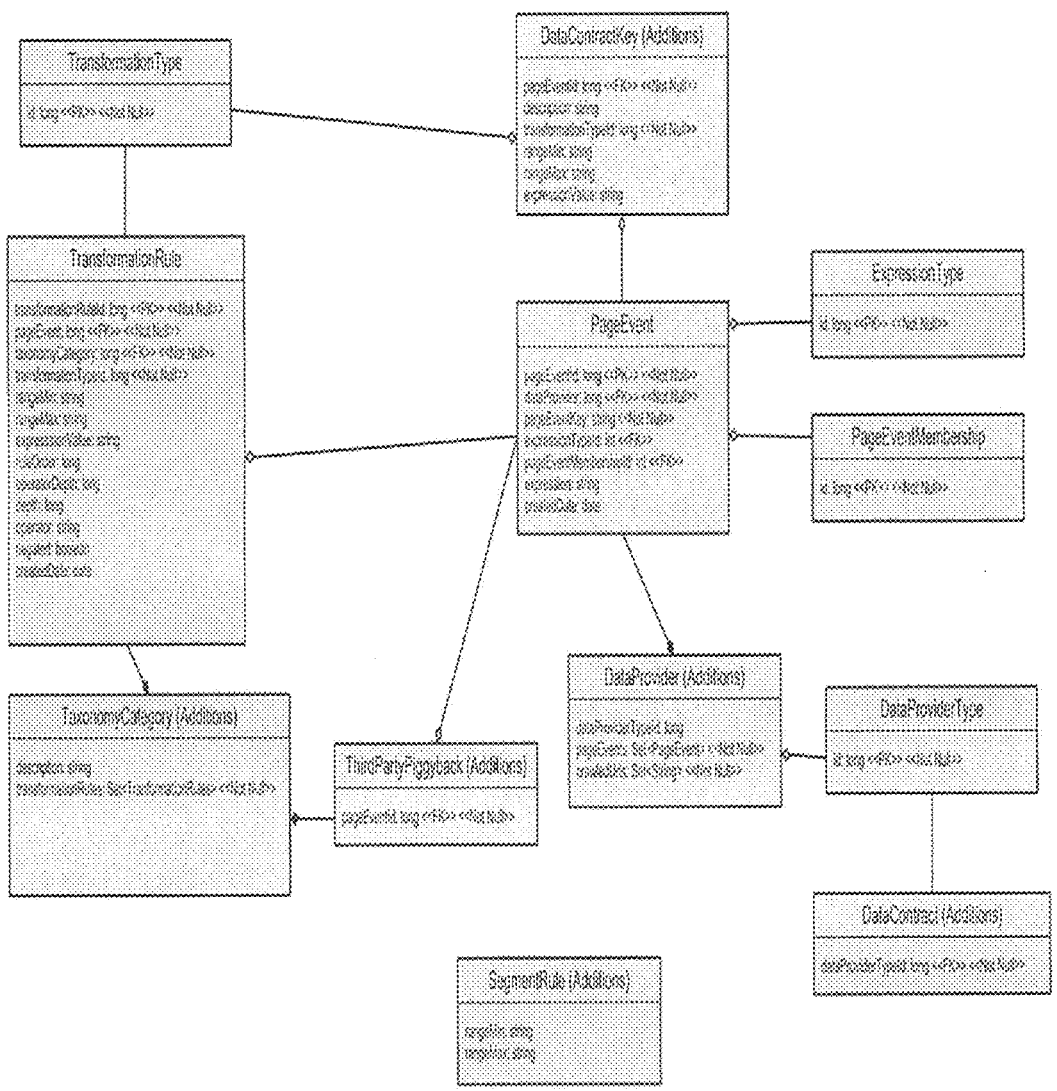
FIG. 2 is a schematic diagram of a data schema used by the universal tag system according to an embodiment of the invention.

In an embodiment, a data schema or model is provided as depicted in FIG. 2. It should be appreciated that such particular details are for the purposes of understanding, are by way of example, and are not meant to be limiting. Examples of data types in the schema includes but are not limited to TransformationType, Transformation Rule, Taxonomy Category, DataProvider, PageEvent, DataContractKey, etc.

Page Event

In an embodiment, an event is also referred to herein as a page event. Page event definitions determine what data a universal tag script should collect from an advertiser's webpage. These definitions may be manually entered via console UI 106 or automatically via the Event Inspector 108. Event inspector 108 may be a widget inside of an advertiser's webpage, such as for example a panel overlaying the webpage, which is described in further detail hereinbelow.

Universal Tag Data Contract

In an embodiment, a universal tag data contract is created using the console in conjunction with the advertiser's website. The data contract is a contract between the advertiser's webpage and one or more advertisers. The data contract may specify which of the events on a webpage to capture and how to transform the data from the captured event from an original format to a format for storage. A data contract definition may determine how event data that have been collected may be interpreted for generating user profile data such as key-values and categorizations. An example of key-value data is a referrer URL as the key and the URL string as the value. The transformation in this example is exact, which means keep the same value as the transformed value. An example categorization is high-end. Such interpretation may be accomplished by applying the defined transformation rules and taxonomy rules of the contract to event data that has been collected.

Configuration System

In an embodiment, configuration system 102 may be a client-facing interface which may be used by users, such as but not limited to marketers, to perform the following but is not limited to the following:

Create the universal tag;
Define what data the universal tag may collect at runtime;
Define how the collected data may be interpreted by related systems via transformations; and
Define taxonomy rules based on the data that are collected.

In an embodiment, configuration system 102 is comprised of three subsystems: a console UI 106 to create and manage universal tags; an injected-script application, live UI 108, also referred to as Event Inspector 108, which a user may use to define context-specific data points in their live sites; and a listener application on a server (herein referred to as "presentation server"), runtime code generator 110, which listens for and converts new data contracts and new event definitions to runtime Java code to update existing Java code.

Console UI

In an embodiment, console UI 106 may be considered a primary entry point to the workflow of universal tag system 100. Console 106 may be responsible for the creation and management of the universal tag. A user may be able to define data points, e.g. events, and be able to view data points that have been designated for the tag thus far. The events may be entered manually or via Event Inspector 108. Console 106 may also allow the user to define data contracts and taxonomy rules using the data points that have been defined.

Figure 3:
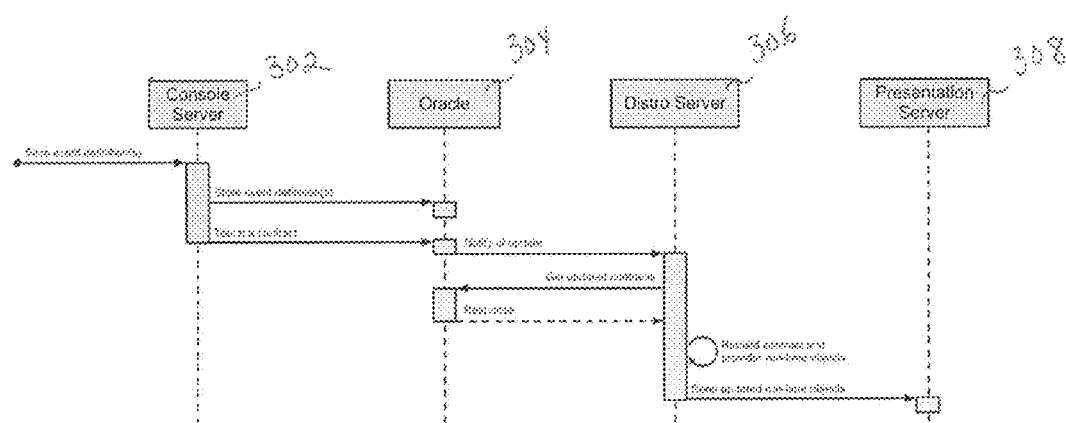
FIG. 3 is a schematic diagram of a universal tag configuration message sequence for an event definition according to an embodiment of the invention.

An embodiment is illustrated in FIG. 3, which is a diagram of a universal tag configuration message sequence for an event definition. In this embodiment, a console server 302 receives an instruction to save an event definition and sends such event definition to be stored at a database 304. As well, console server 302 touches a contract at database 304, which notifies a presentation server 306 of an update to a contract. Presentation server 306 requests an updated contract from database 304, which responds, accordingly. Presentation server 306 rebuilds the contract and provider runtime objects and sends updated runtime objects to a presentation server 308. In an embodiment, presentation server 308 pulls data from presentation server 306, rather than presentation server 306 pushing the data.

Figure 4:
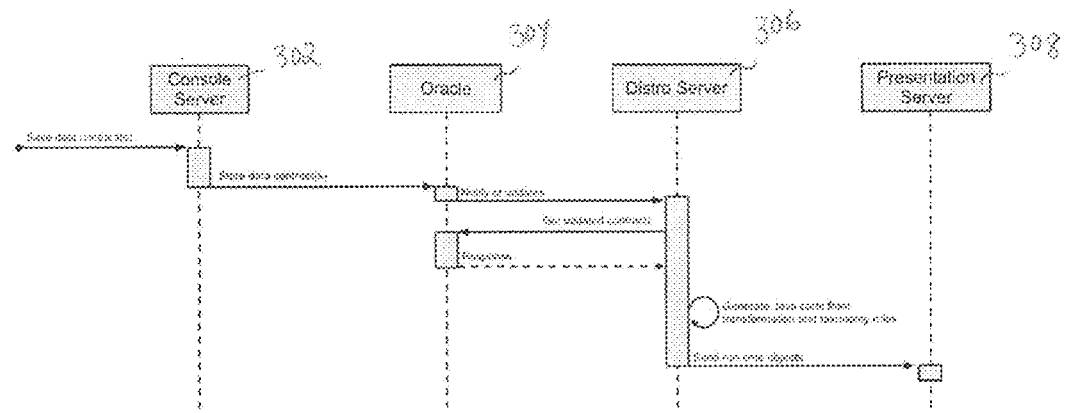
FIG. 4 is a schematic diagram of a universal tag configuration message sequence for a contract definition according to an embodiment of the invention.

In FIG. 4, a flow diagram of a universal tag configuration message sequence for a contract definition in accordance with an embodiment is provided. Console server 302 receives a request to save data about contracts and sends such data to database 304 for storage. Database 304 notifies presentation server 306 of the update. Presentation server 306 requests the related updated contract from database 304 and receives such update. Presentation server 306 generates Java code from corresponding transformation and taxonomy rules and sends such generated runtime objects to presentation server 308. In an embodiment, presentation server 308 pulls data from presentation server 306, rather than presentation server 306 pushing the data.

Event Inspector

In an embodiment, a universal tag Event Inspector is an application, which runs in the context of an advertiser's webpage to enable users such as but not limited to marketers to define context-specific data collection points without the need for technical knowledge of the webpage. Such application may be instantiated on the website by the user clicking an event inspector bookmark on their browser. The application may be responsible for providing the client with a user interface, e.g. an event inspector panel, to explore data on the webpage and to designate for collection any data that are available to be collected by the universal tag on the webpage.

Figure 9A:
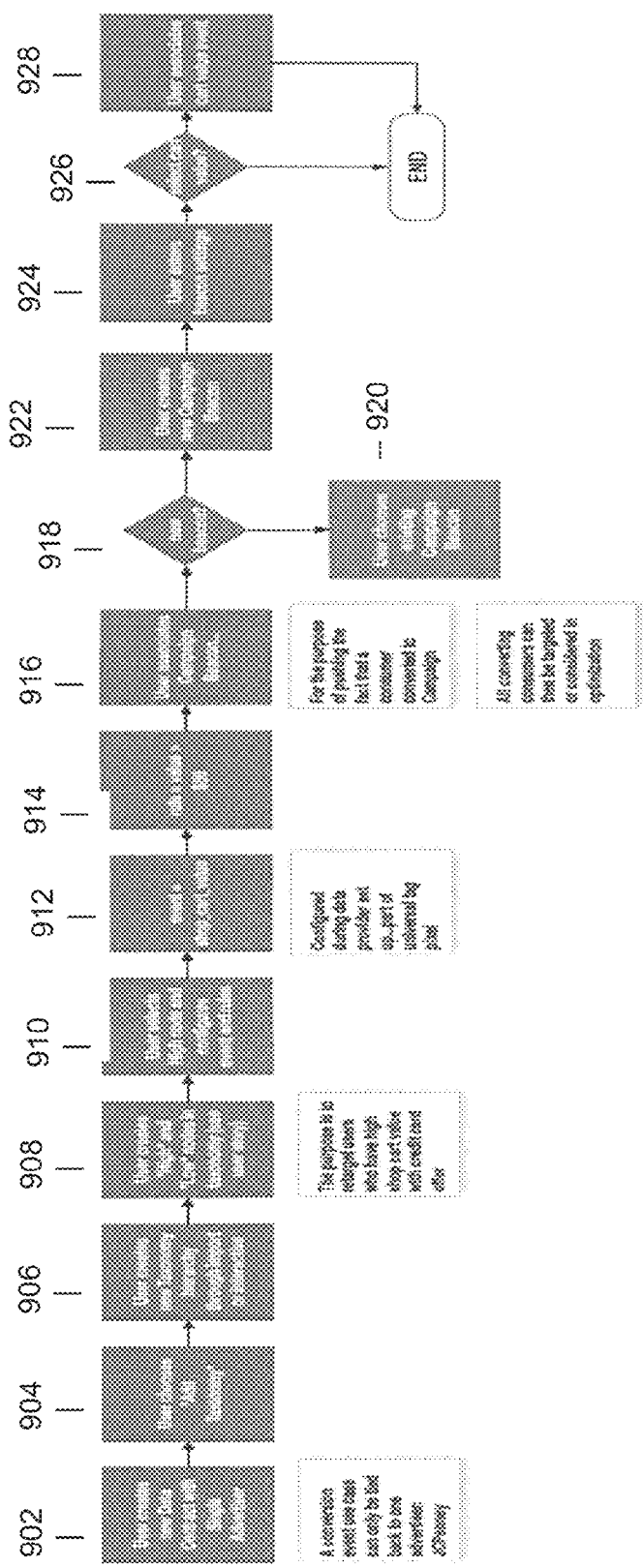
FIG. 9A is a flow diagram for creating a taxonomy hierarchy and associating an appropriate campaign beacon according to an embodiment of the invention.
Figures 9B, 10:
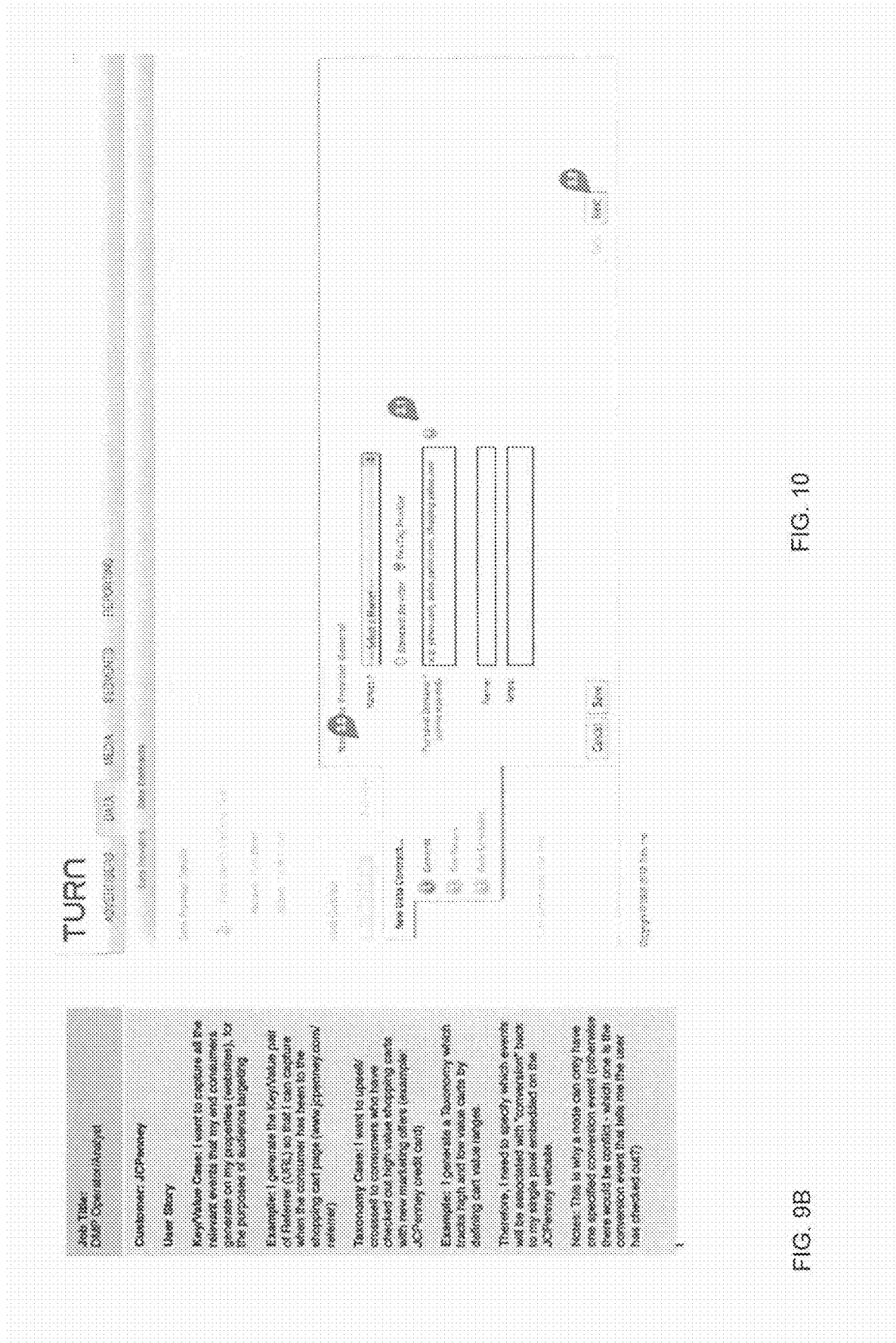
FIG. 9B is a chart showing an example use case of a user generating a Key/Value pair of the referrer (URL) to capture when the consumer has been to the shopping cart page and generating a taxonomy, which tracks high and low value carts by defining cart value ranges according to an embodiment of the invention.
FIG. 10 shows a user interface for creating a data provider according to an embodiment of the invention.

In an embodiment, because such application may modify client data from an external origin security concerns may be addressed by, for example, use of a secure top level domain (see FIG. 10; 3.1).

Runtime Java Code Generator

In an embodiment, presentation server 306 listens for new data contract definitions or new event definitions. When a new data contract is detected, the runtime Java code generator on presentation server 306 generates the Java code for evaluating the related transformation and taxonomy rules. Presentation server 306 pushes such generated code to presentation server 308 to be executed at runtime. When a new event definition is detected, the runtime Java code generator may update a runtime provider object and push such object to presentation server 308.

Following are sample new classes and changes to existing classes for illustrative purposes only and are not meant to be limiting.

New Classes:
RuntimeKVTransform;
RuntimeTaxTransform; and
RuntimePageEvent

Changes to Existing Classes:
RuntimeDataContractCorpus must have a getByProviderId(int);
RuntimeDateContract must have List<RuntimeTransformation>;
RuntimeDataProvider must have List<RuntimePageEvent>; and
SegmentRuleBuilder and SegmentAttributionRuleBuilder must support new SegmentRule types.

Runtime System

In an embodiment, runtime system 104 may be an automated system which is triggered by universal tag script codes which reside on advertisers' websites. For example, when a website loads, the universal tag script codes may activate runtime system 104. Responsibilities of runtime system 104 may include but are not limited to the following. Here, client-defined refers to the user such as the marketer and user refers to the consumer at the website.

Collect the event data the universal tag is configured to collect;
Apply the client-defined transformation to the collected data and store such transformation in the user profile of the consumer; and
Apply the client-defined taxonomy rules on the collected data and categorize users accordingly.

In an embodiment, runtime system 104 may be comprised of two subsystems: a universal tag script 114 and an endpoint 112 with which tag script 114 communicates. Endpoint 112 applies the transformation and taxonomy rules to incoming data.

Figure 5:
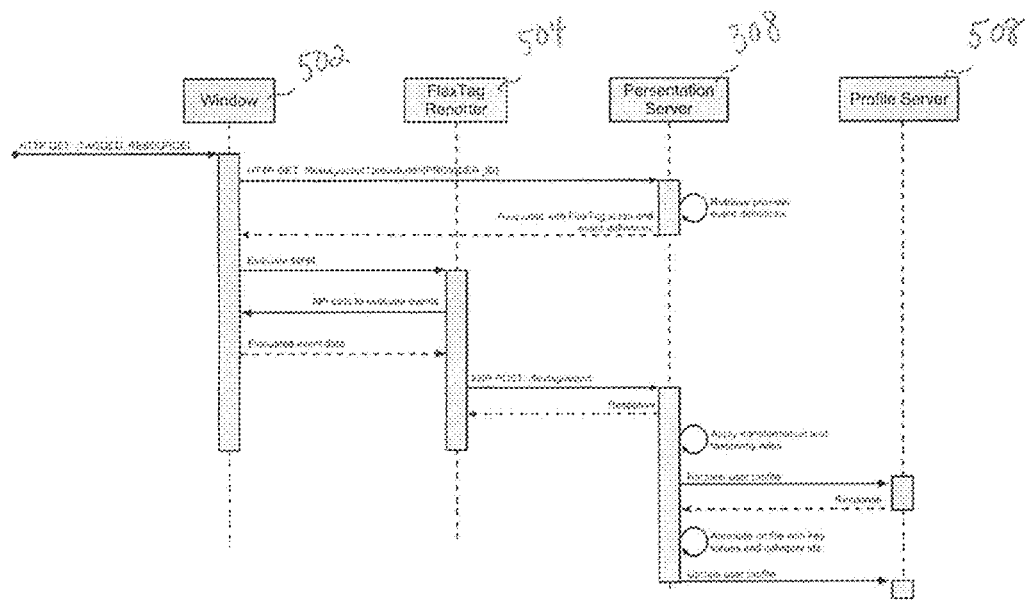
FIG. 5 is a flow diagram showing the interactions between a window, a universal tag reporter, presentation server, and a profile server at runtime according to an embodiment of the invention.

A runtime message sequence in accordance with an embodiment may be understood with reference to FIG. 5, which is a flow diagram showing the interactions between a window 502 such as the consumer's browser, a universal tag reporter 504, presentation server 308, and a profile server 508.

1. A client's user visits a client's website 502 which has the universal tag script embedded in it.
2. A request is made to presentation server 308 to provide the universal tag script for a given provider id.
3. Presentation server 308 gathers the event definitions relevant to the given provider id.
   a. The presentation server uses the providerId to retrieve a List<RuntimeDataContract> from the RuntimeDataContractCorpus; and
   b. It also extracts List<RuntimePageEvent> from the RuntimeDataProvider object (which is retrieved from one of the RuntimeDataContracts)
4. Presentation server 308 puts the generic universal tag, along with provider-specific events to collect in the HTTP response body and sends it back to the client's user's browser 502.
5. The browser 502 interprets the script, creating universal tag reporter 504.
6. For each event definition, the reporter 504 makes API calls to the Window 502 object to resolve the event expressions.
7. The browser 502 provides evaluated event data to the reporter 504.
8. The reporter 504 posts a key-value list of event names and values along with the providerid and userid to the presentation server 308.
9. The presentation server 308 acknowledges receipt immediately.
10. The presentation server 308 applies transformation and taxonomy rules to the returned keys.
    a. Provider id is used to retrieve relevant RunTimeDataContracts vis RuntimeDataContractCorpus; and
    b. For each KVTransform and TaxTransform in all RuntimeDataContracts, run the transforms, resulting in a map of key-values and a list of category ids for each contract.
11. Presentation server 308 requests the user profile from a profile server 508 for the given userid.
12. Profile server 508 responds with the user profile.
13. The user's profile is annotated with the data with transformed key-values and taxonomy category ids.
14. The annotated profile is pushed back to Profile server 508. It should be appreciated that there are two profiles that may be pushed: one for analytics and one for runtime.

Universal Tag Script

In an embodiment, the universal tag script runs in the context of the client's webpage and is responsible for collecting event data for events which have been defined in configuration system 102 and for reporting such event data back to runtime endpoint 112.

Figure 6:
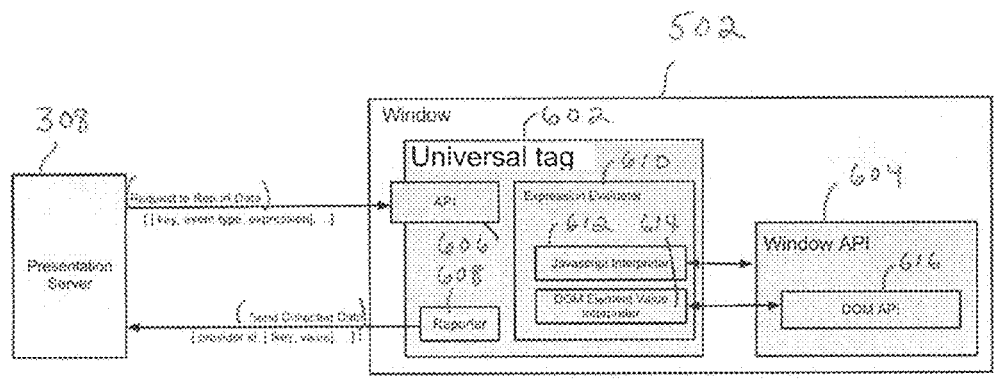
FIG. 6 is a schematic diagram showing the communication between universal tag script components when the script is run according to an embodiment of the invention.

An embodiment of universal tag script components and communication can be understood with reference to FIG. 6. Presentation server 308 requests to report data to window 502, which sends collected data back to presentation server 308. In the embodiment, window 502 comprises but is not limited to a universal tag component 602, which communicates with presentation server through an API component 606 and a reporter component 608. As well, universal tag component 602 comprises an expression evaluator comprising a JavaScript interpreter 612 and a DOM Element Value interpreter 614. JavaScript interpreter 612 communicates with window API 604 and DOM Element Value interpreter 614 communicates with DOM API 616.

It should be appreciated that in an embodiment, having the tag script on a clients' website may substantially increase the number of HTTP connections that are made with presentation server 308. Such increase may be mitigated through the use of a caching reverse proxy.

Runtime Endpoint

In an embodiment, runtime endpoint 112 runs on presentation server 308 and is a communication point for the client-side universal tag script. Universal tag runtime endpoint 112 is responsible for generating the client-side universal tag script for a given provider id and providing the list of data collection points from which to retrieve data. The universal tag script may then report the data back to such endpoint 112, where the transformation rules which were defined in the configuration system 102 may be applied. The system may then annotate the given user's profile with the transformed data and update the profile server 508.

Figure 7:
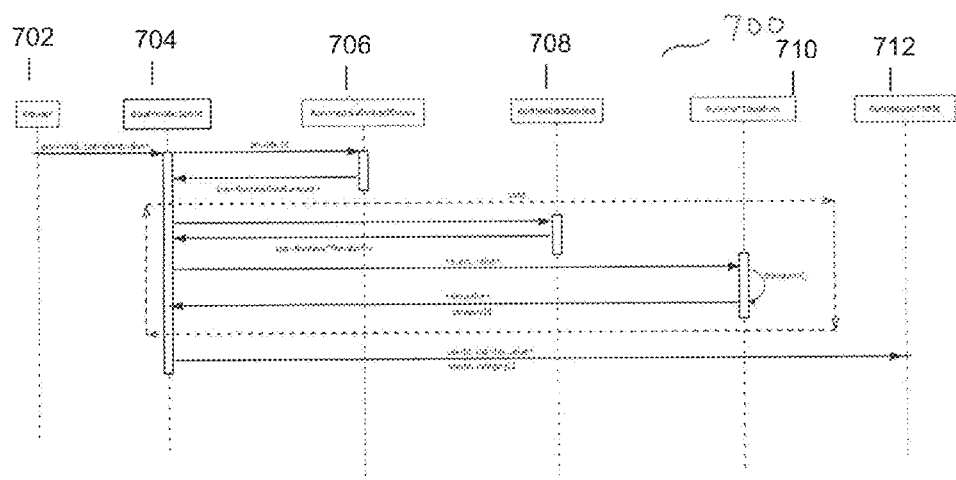
FIG. 7 is a flow diagram showing a particular universal tag endpoint internal message sequence according to an embodiment of the invention.

An example implementation in accordance with an embodiment is illustrated in FIG. 7, which is a flow diagram showing a particular universal tag endpoint internal message sequence 700. A consumer's browser 702 sends a list of collected events and values and the corresponding provider id to a data provider servlet application 704. Data provider servlet application 704 sends the provider id to a runtime data contract corpus 706, which returns a list of corresponding data contracts. An iterative loop process convenes. Data provider servlet application 704 sends a request for a list of corresponding runtime transformations applications from a runtime data contract application 708. Data provider servlet application 704 then sends an <event, value> pair to a runtime transform application 710 to perform the appropriate transformation on the <event, value> pair. Runtime transform application 710 returns <key, value> pair and an appropriate category id. Upon termination of the iterative process, data provider servlet application 704 sends a user id and the corresponding list of <key, value> pairs and the user id and the corresponding category id to a runtime user profile application 712 for storage.

An Exemplary User Interface and Related Workflows

One or more embodiments of a user interface for a universal tag management tool and related workflows may be understood with reference to the following figures. It should be appreciated that particular details are by way of example and are not meant to be limiting.

Figure 8A:
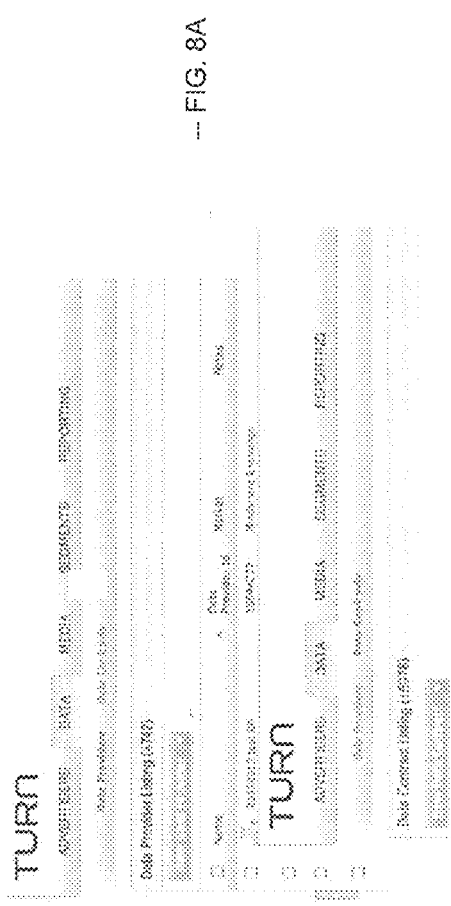
FIGS. 8A and 8B show a user interface for a universal tag data provider list page and a flow diagram for creating a universal tag for data collection according to an embodiment of the invention.

FIG. 8A is user interface of a universal tag data provider list page and navigation page as provided in console UI 106, in accordance with an embodiment. From here, a user may view the list of existing data providers or may create a new data provider. As well, the user may view a list of existing data contracts or create a new data contract.

Figure 8B:
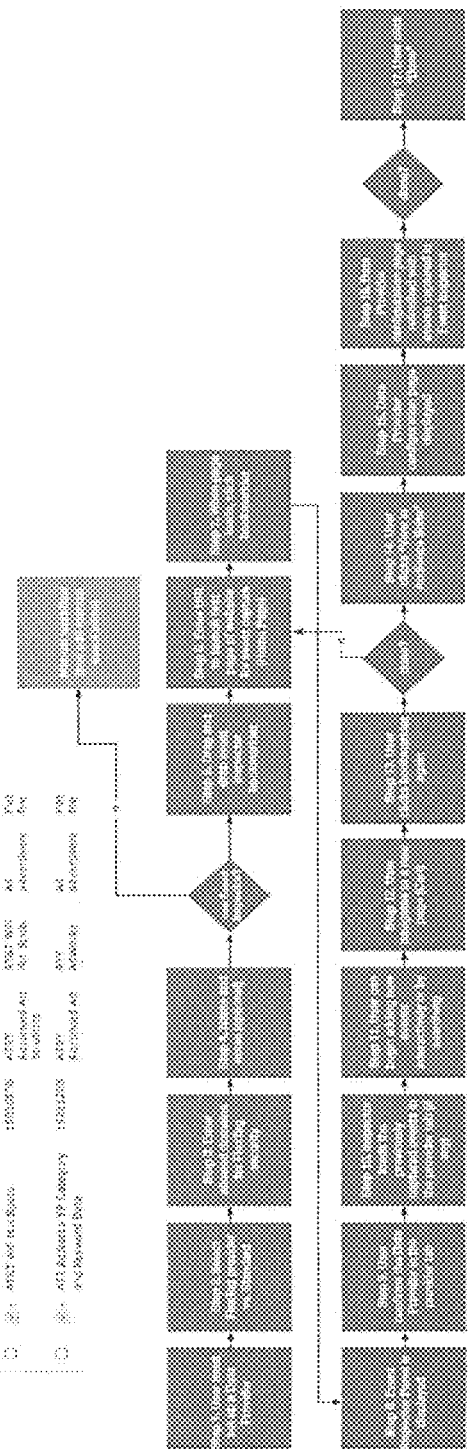

As well, FIG. 8B shows a high level workflow of the steps the user may need to take to create an active universal tag data collection. It should be appreciated that particular details are by way of example only and are not meant to be limiting.

In Step 1, the user sets up a data provider.

In Step 2, the user selects if the user wants to use a provider with universal tag availability.

In Step 3, the user enters allowed domains for universal tag security.

Step 4 is optional and is for the user to enter a name for the process and any notes. Next (step number not listed), the user decides if he wants to use the Event Inspector. If no, he may add event definitions manually via the console. If yes, the user proceeds to Step 5.

In Step 5, the user drags and drops the Event Inspector bookmarklet.

In Step 6, the user enters the URL which launches the first page of the website for event capture, e.g. the Home page of the website.

In Step 7, when the webpage loads, the user clicks the bookmarklet.

In Step 8, the Event Inspector panel is displayed.

In Step 9, the user confirms the data provider in the provider tab.

In Step 10, the Event Inspector loads the previously captured events in the provider tab, if any.

In Step 11, the user can begin adding new events interactively or by searching.

In Step 12, the user navigates to a new page, e.g. shopping cart.

In Step 13, the user clicks the bookmarklet again and the process repeats from Step 8. When the user is finished configuring the Event Inspector for that particular website, the user may go to Step 6, in which he may enter a new URL for a new website and continue with the process. When the user is done completing configuration for all websites (no step number), control goes to Step 14.

In Step 14, the user may choose to view his configuration, which, in this example is in an application referred to as "Audience Suite."

At Step 15, the data provider configuration page is displayed in the application.

At Step 16, the data provider configuration page is refreshed with events that are captured in the Event Inspector as they are defined.

At Step 17, the user is done and exits the application.

FIG. 9A is a flow diagram of a taxonomy setup workflow in accordance with an embodiment of the invention. It should be appreciated that particular details are by way of example only and are not meant to be limiting.

In Step 902, the user creates a new data contract with a single advertiser.

In Step 904, the user chooses to add taxonomy.

In Step 906, the user creates a new taxonomy hierarchy through importing an existing taxonomy file or interactively.

In Step 908, the user creates high nodes and low nodes in the taxonomy. FIG. 9B may be referred to as an example.

In Step 910, the user selects high node and configures events and rules, accordingly.

In Step 912, the user sets an event to shop_cart_value, which was configured during the data provider configuration as part of the universal tag.

In Step 914, the user configures a rule to be value >$50.

In Step 916, the user associates a particular advertising signal, referred to herein as a campaign beacon. This step serves the purpose of pushing back to the signal information reflecting the fact that a consumer conversion has been made. A key aspect is for the system to have the information that converting segments can then be targeted or considered in further optimization analyses.

In Step 918, the user decides if a new campaign beacon needs to be created. If no, in Step 920, the user chooses an existing campaign beacon. If yes, in Step 922, the user creates a new campaign beacon.

In Step 924, the user enters particular settings for the new campaign beacon.

In Step 926, the user decides if he should select a cart value. If no, the taxonomy process ends. If yes, in Step 928, the user associates the selected cart value with the appropriate event.

FIG. 9B is a sample user story to accompany the taxonomy setup workflow of FIG. 9A in accordance with an embodiment of the invention.

FIG. 10 shows a user interface for creating a data provider in accordance with an embodiment of the invention. In an embodiment, the controls are progressively dynamic 3.0. In cases where a market is available, only those markets where universal tags are enabled allow the second radio button selection, otherwise the default is on the standard provider. In an embodiment, an add inline help link for the top level domains field is provided 3.1. On a "Next" submit, the form should validate URLs entered in top level domains 3.2. It is believed that most of the time the user may enter data correctly, such that the process continues to the next step. In the event that the domain is mistyped, a message is shown.

Figure 11:
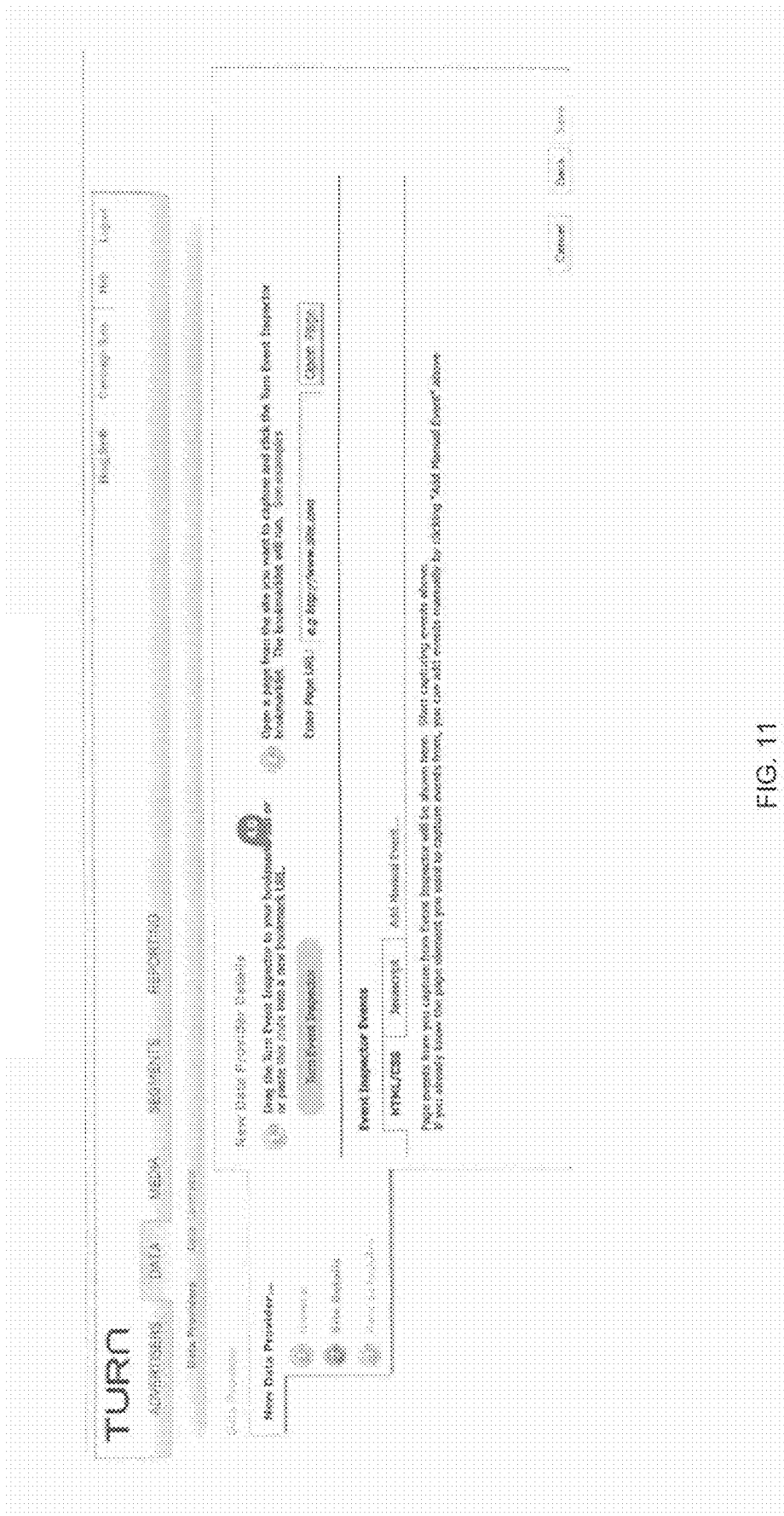
FIG. 11 shows details of a user interface for creating a universal tag bookmarklet according to an embodiment of the invention.

FIG. 11 shows a user interface for creating a universal tag bookmarklet in accordance with an embodiment of the invention. In an embodiment, the JavaScript text is copied to the clipboard when the user clicks "this code" 4.0. Such process to create a bookmark may be done manually or the drag and drop bookmarklet may be found to be an easier method. In an embodiment, the user may not be able to save the data provider with no events details 4.1. The button may be disabled. The cancel button cancels out of the data provider creation workflow. Back returns to the previous page where the user enters data provider metadata.

Figure 12:
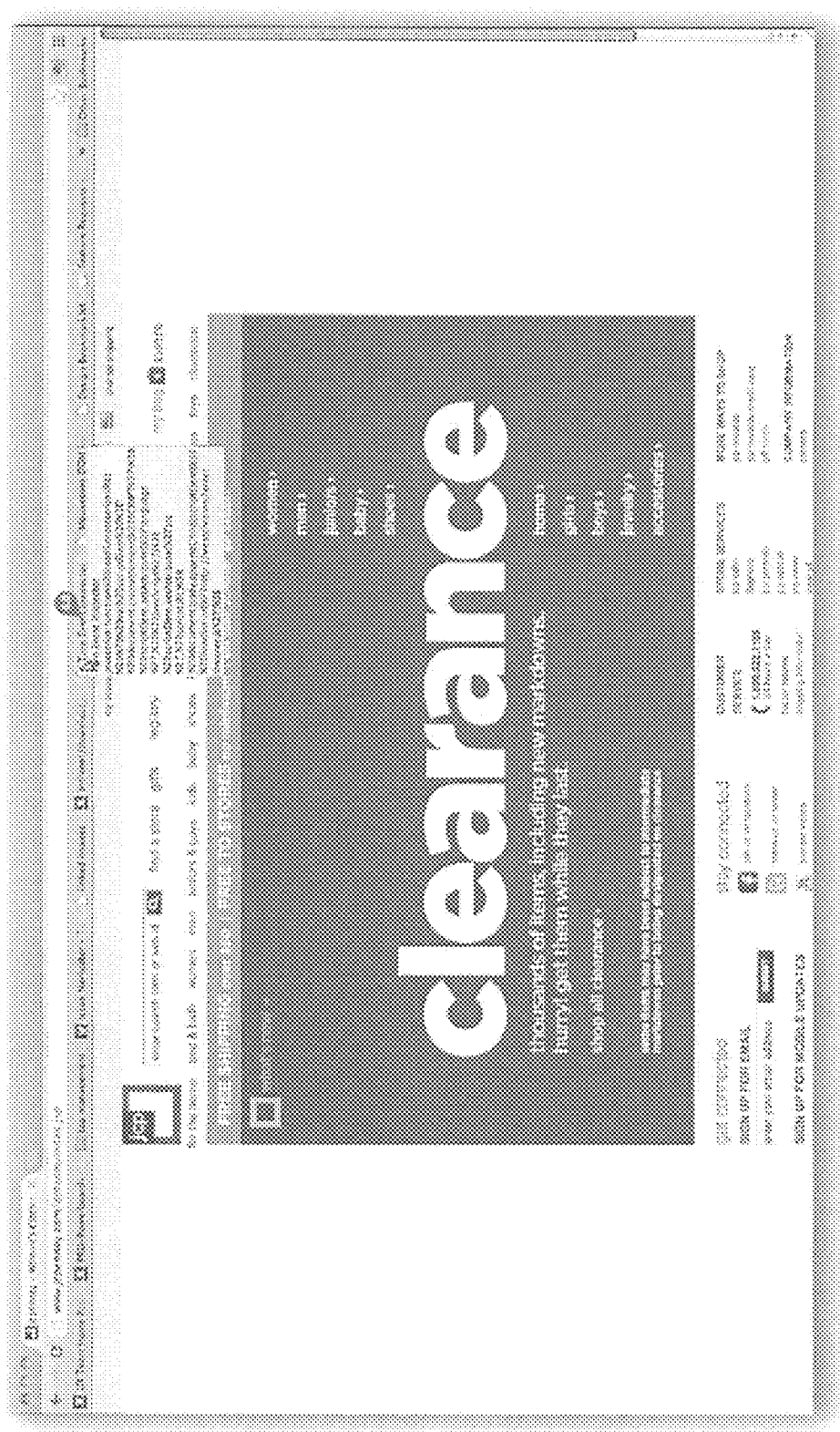
FIG. 12 shows a user interface having an installed bookmarklet in the bookmark bar according to an embodiment of the invention.

FIG. 12 shows a user interface showing the installed bookmarklet in the bookmark bar in accordance with an embodiment of the invention. The bookmarklet is shown to have been dragged to the bookmark in this case 5.0. Sample JavaScript code is shown.

Figure 13B:
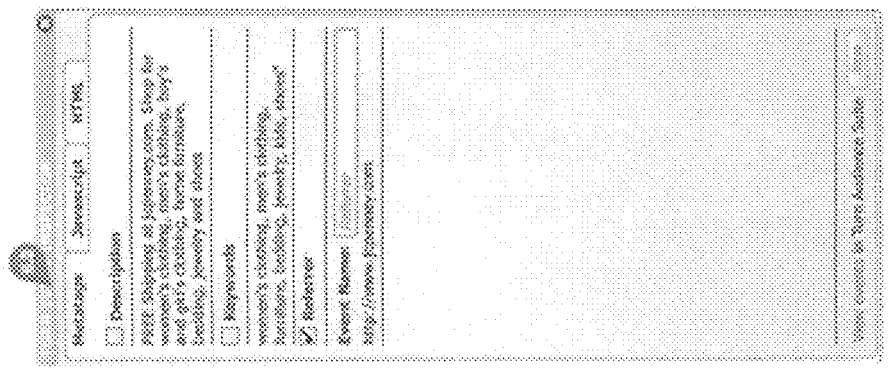
FIG. 13B shows an example event inspector panel for FIG. 13A, which is populated with data after the user has logged into the system console according to an embodiment of the invention.
Figure 13A:
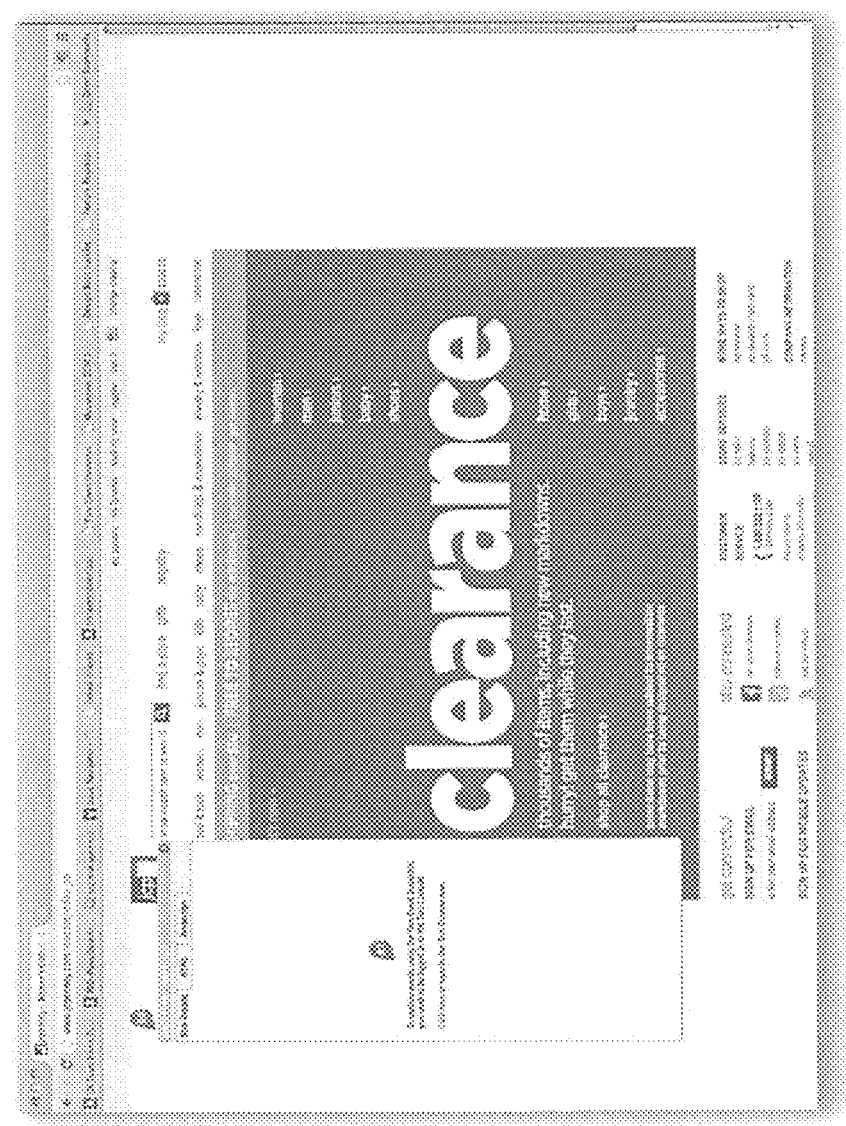
FIG. 13A shows a user interface having a blank overlay event inspector panel that was triggered by the installed bookmarklet according to an embodiment of the invention.

FIG. 13A shows a user interface showing a blank overlay event inspector panel that was triggered by the installed bookmarklet according to an embodiment of the invention. The bookmarklet triggers the sidebar overlay, which displays the page elements that may be captured 6.0. The panel may be wider and support more tabs when necessary, when other groups are needed, for example. The user may need to be logged in to use the event inspector 6.1. The panel may link the user to the login page. After login the user should be redirected back to the URL that was entered. The user may reactivate the bookmarklet, for example.

FIG. 13B is an example event inspector panel for FIG. 13A, which is populated with data after the user has logged into the system console according to an embodiment of the invention.

Figure 14:
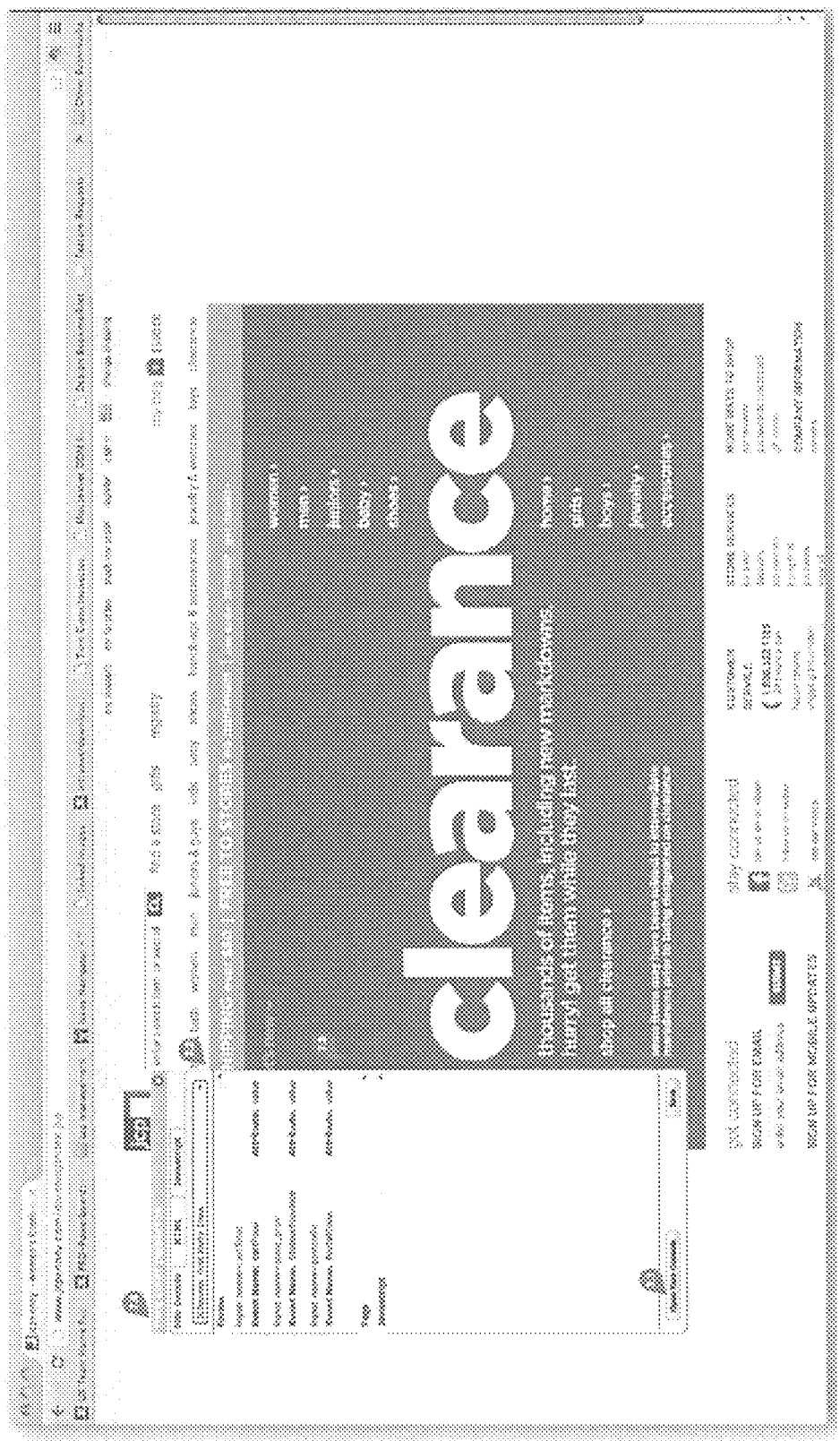
FIG. 14 shows a user interface having the event inspector overlay that is populated with configured page elements that may be captured according to an embodiment of the invention.

FIG. 14 shows a user interface showing the event inspector overlay that is populated with configured page elements that may be captured, in accordance with an embodiment. The bookmarklet triggers the sidebar overlay, which displays the page elements that can be captured 7.0. The panel may be wider and support more tabs when necessary (when other groups are needed). The Save button may have a grey/disable state when there are no events to save, affording its purpose when it becomes active, e.g. the user selects something to capture. This gives the user assurance that something is happening, e.g. feedback. When possible the panel may link back to an audience suite and this data provider's edit page 7.1. The initial tab may be "Provider" 7.2. The provider the user selected in the audience suite may be the default, e.g. in the usual case of the user starting a new provider in the audience suite, it may be likely that the correct provider is the last one selected. However, the drop down allows the user to change data providers. The objects/events the user previously captured may be shown along with the current name value 7.3. The user should not be able to change this name in this context for v1 or the attribute. Also, when the user chooses another tab, the previously selected objects may show in the list with the given name. An embodiment does not "hide" previously configured objects. It may be important to optimize the panel for efficiency. Form capture may be the main use case and, therefore, form capture may be presented as a primary interface element even when it may technically the same as any other HTML element.

Figure 15:
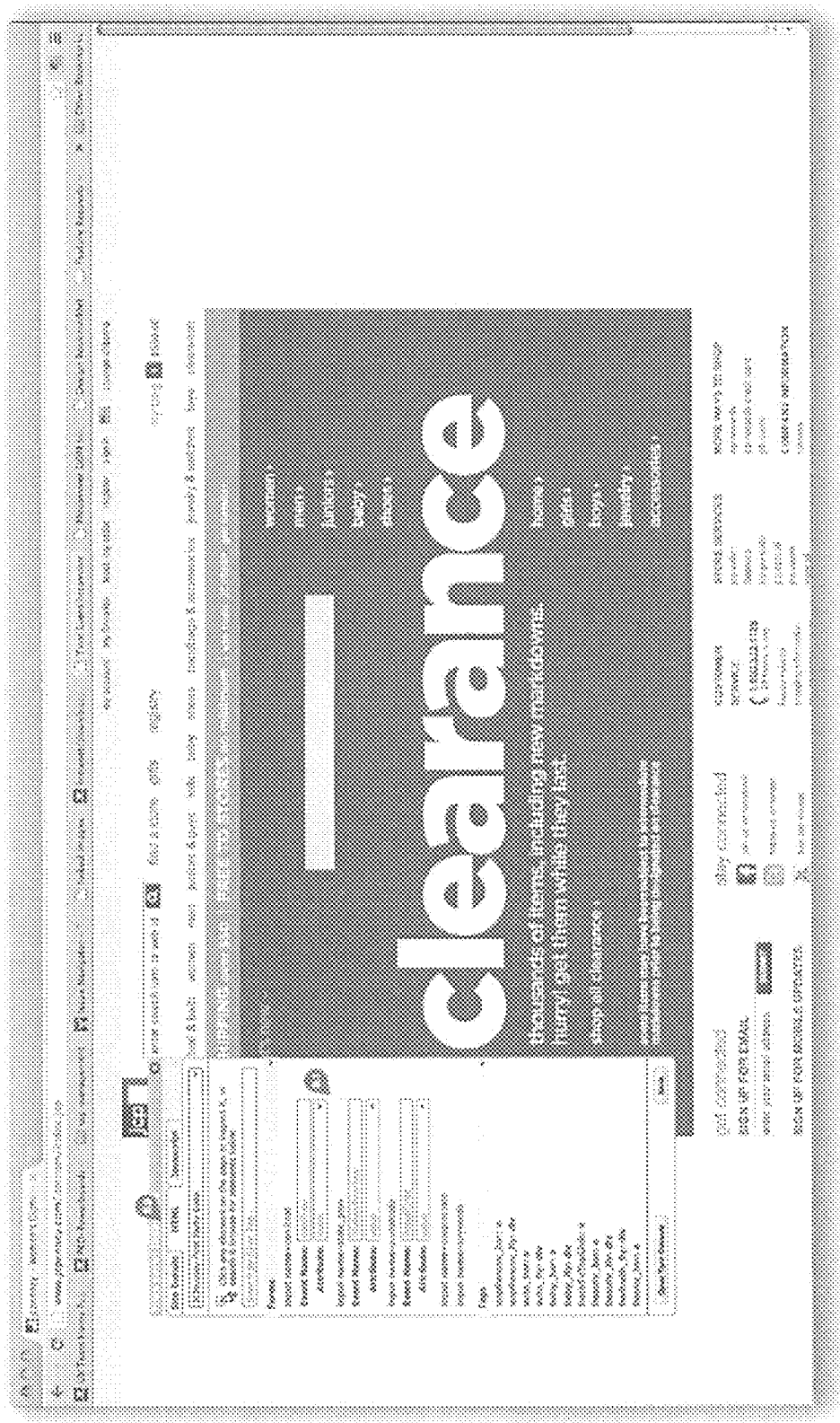
FIG. 15 shows a user interface having a page tree of user interface elements as well as how a user may input events and save according to an embodiment of the invention.

FIG. 15 shows a user interface showing a page tree of user interface elements as well as how a user may input events and save in accordance with an embodiment of the invention. The HTML/CSS tab shows the page tree of UI elements 8.0. This may be separated from the JavaScript tree because the two tasks may require different levels of understanding. When the user selects an object/event then the form fields dynamically display allowing the user to name the event with a friendly name and the attribute drop down defaults to a common value (such as "value" for input fields) 8.1. The user may input many objects/events and then click save.

Figure 16:
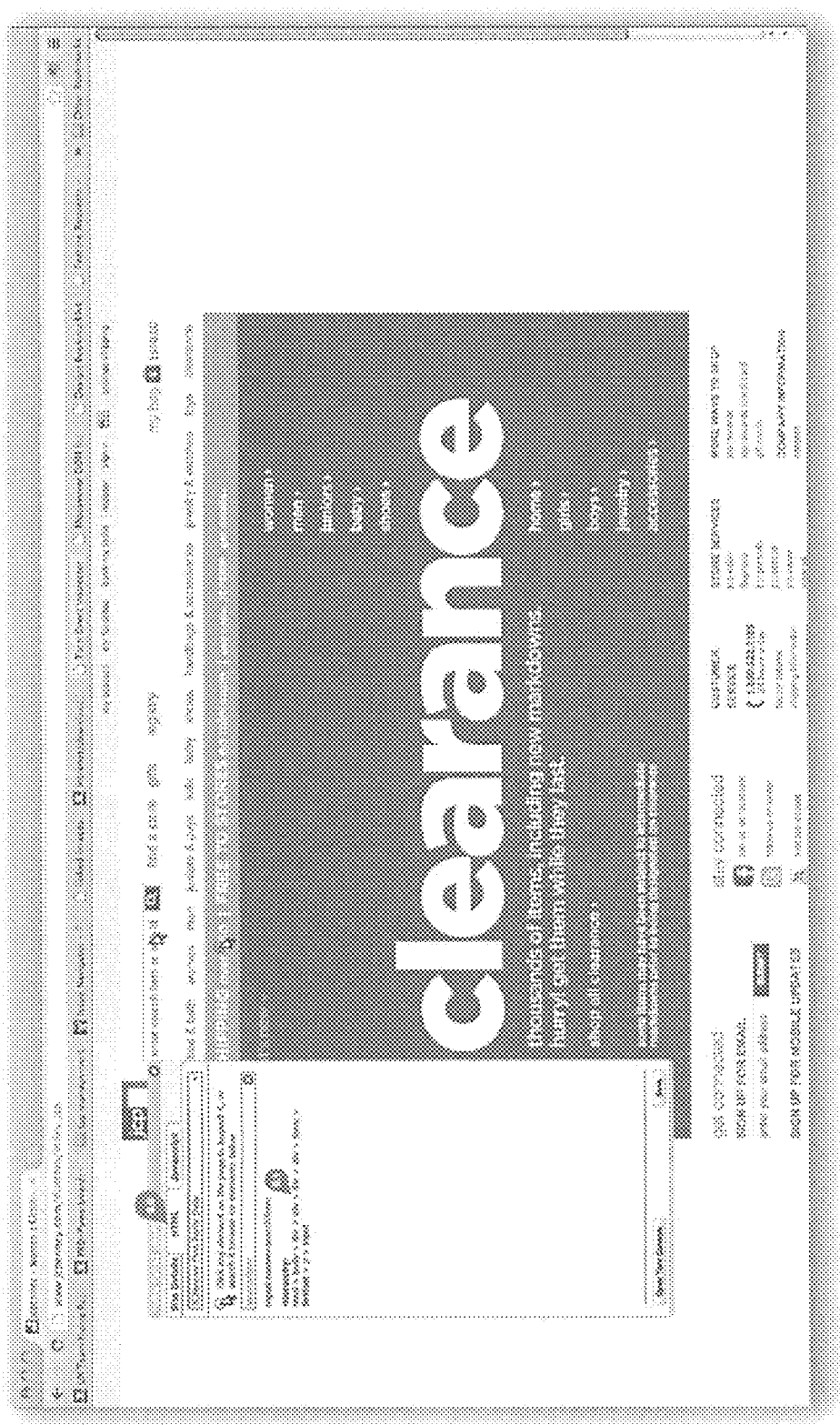
FIG. 16 shows a user interface with which a user may interactively select an element in the page and the overlay panel automatically updates to show which item is selected according to an embodiment of the invention.

FIG. 16 shows a user interface showing that a user may interactively select an element in the page and the overlay panel automatically updates to show which item is selected in accordance with an embodiment of the invention. For example, the user may interactively select elements in the page and the HTML panel may update to show which item is selected 9.0. The page listener may only be active in this mode. The panel tells the user that he may use the mouse pointer. Because the user may be pointing to an element on the page that is not the target object, in this mode, the hierarchy may be shown and may be interactively clicked 9.1.

Figure 17:
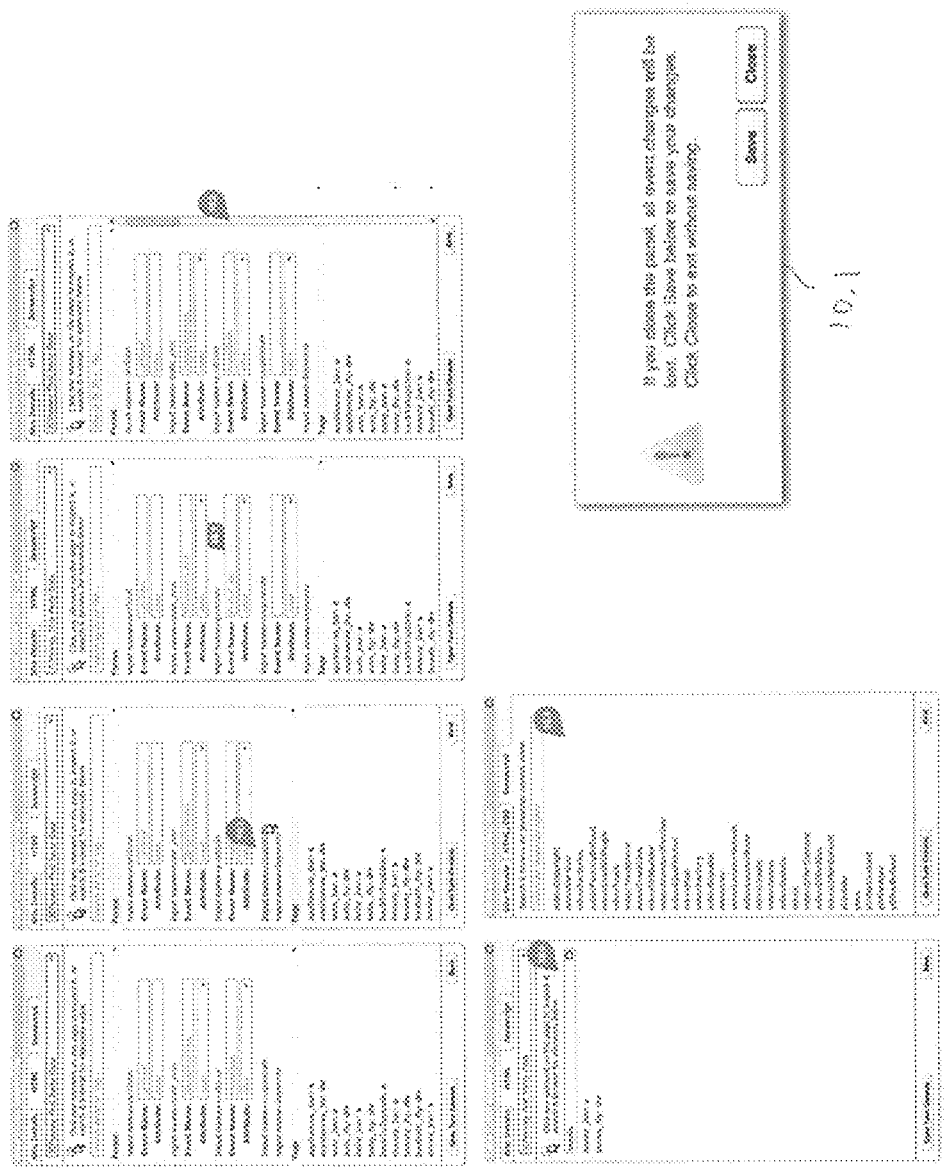
FIG. 17 shows a plurality of panel variations as well as an error message box for any panel according to an embodiment of the invention.

FIG. 17 shows a plurality of panel variations as well as an error message box for any panel in accordance with an embodiment of the invention. The user may select any object listed 10.0. The form elements should be listed with the type of element and the best identifier. In the case of Input elements, Name. The name field is dynamically shown on Click 10.1. The name persists in the field until the user saves or closes the panel. On close, the warning popup should be shown. Scroll bar scrolls the entire panel 10.2. On first use, the user may likely notice that there is an HTML and a Forms section. Data are buffered when the form elements with event names push the HTML section down the panel. The panel height may be maximized on height given the browser resolution. When the user types into the search field, the content updates showing only the objects that match the query (against ID and name) 10.3. An example of the JavaScript is shown 10.4.

Figure 18:
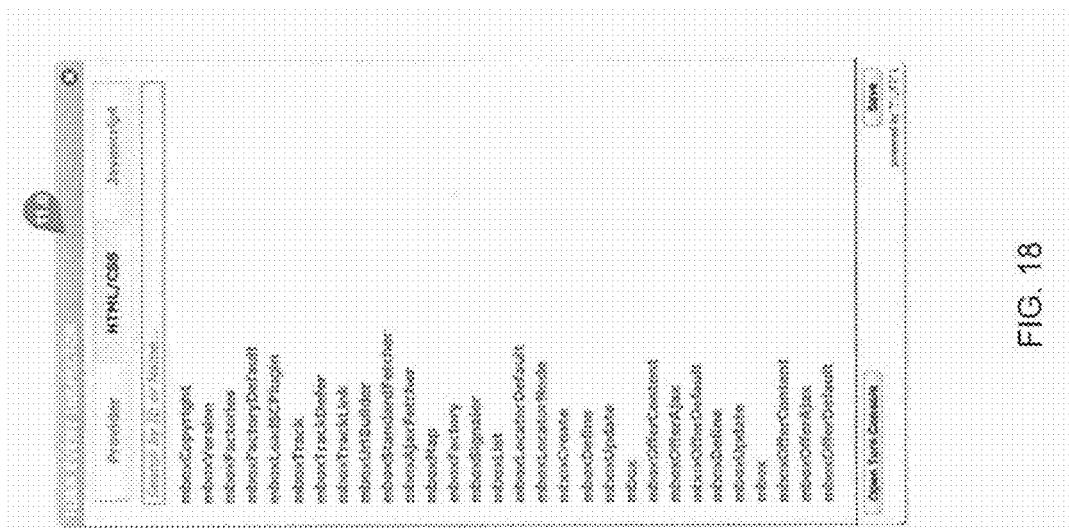
FIG. 18 shows a user interface having an example panel according to an embodiment of the invention.

FIG. 18 shows a user interface showing an example, refined panel in accordance with an embodiment of the invention. This UI shows a more refined look and feel for the panel and should be the guide for the layout and visual design 11.0. The other panels provided may be wireframes and not pixel perfect.

Figure 19:
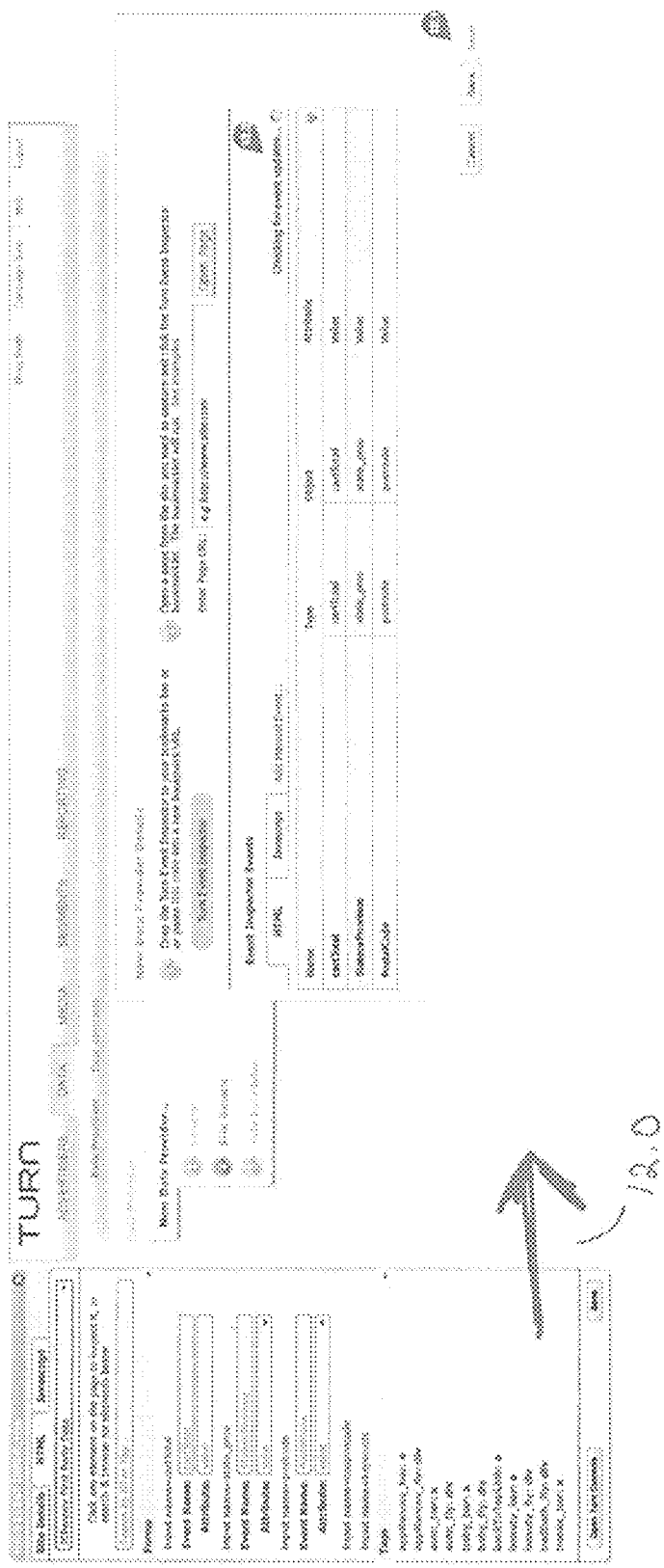
FIG. 19 shows a user interface in which the panel can link back to the data provider edit page of the console according to an embodiment of the invention.

FIG. 19 shows a user interface showing how the panel can link back to the data provider edit page of the console in accordance with an embodiment of the invention. The panel links back to the data provider edit page when possible 12.0. The button is disabled unless manual events are added 12.1. The Event Inspector events that are updated dynamically do not require resaving, unless the user changes the name. A polling mechanism should check to see if new events are added 12.2. When events are found then a message is shown until the next poll interval.

Figure 20:
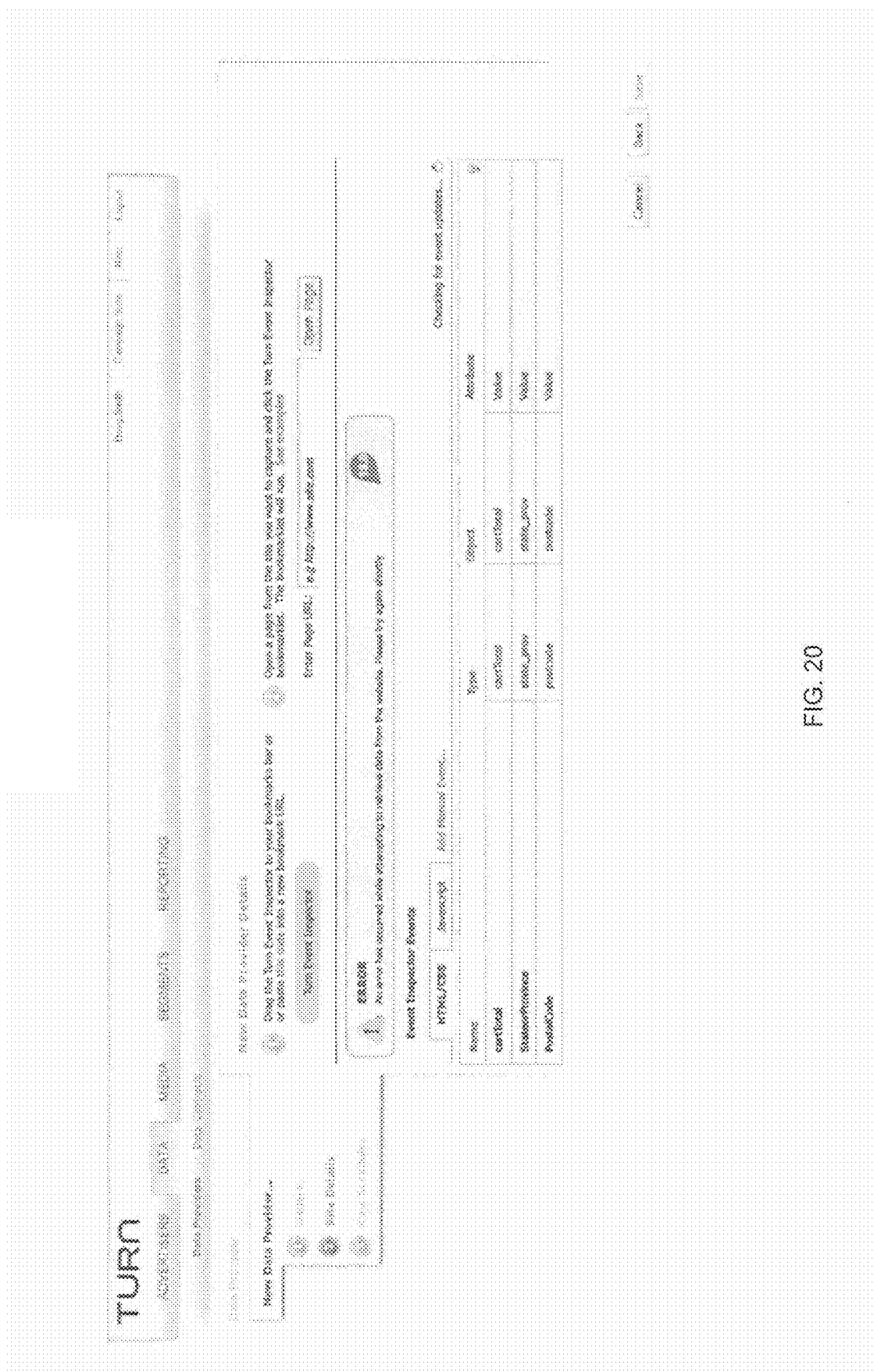
FIG. 20 shows a user interface having an error message about an error occurring while attempting to retrieve data from the website according to an embodiment of the invention.

FIG. 20 shows a user interface showing an error message about an error occurring while attempting to retrieve data from the website in accordance with an embodiment of the invention. The error case shows error a message widget 13.0.

Figure 21A:
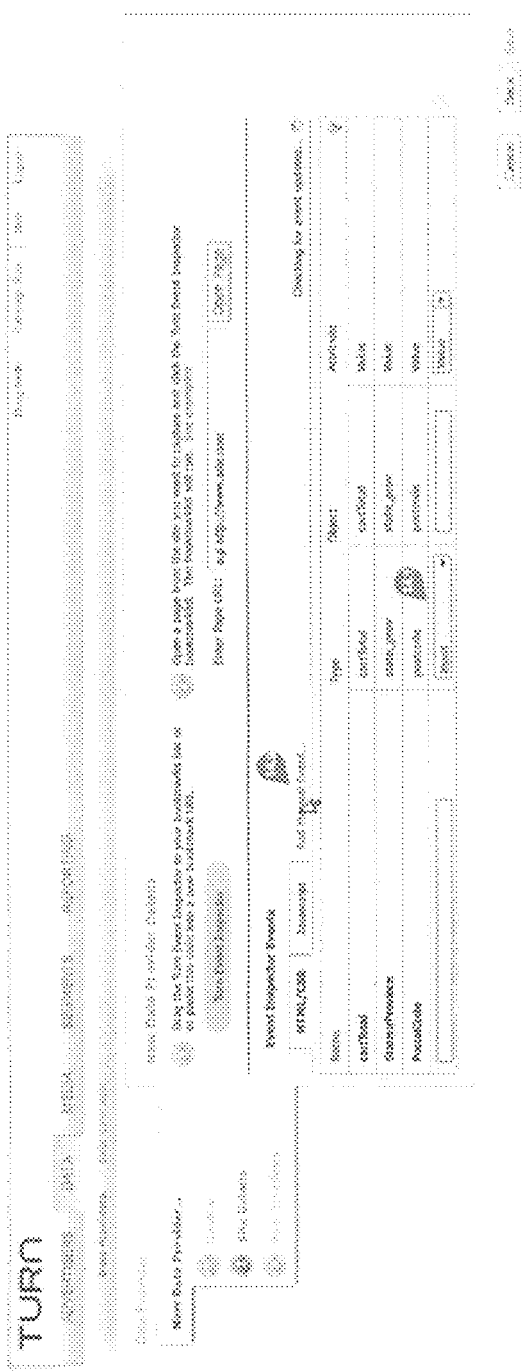
FIG. 21A shows a user interface in which a user may add an event manually according to an embodiment of the invention.
Figure 21B:
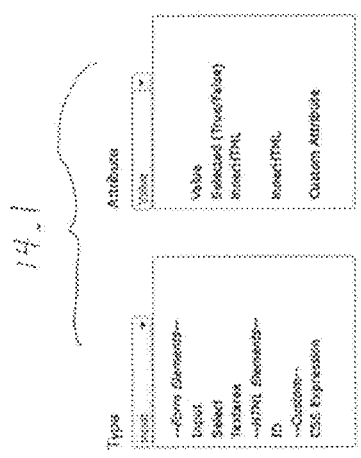
FIG. 21B shows two user interfaces for required type and attribute of an event added manually according to an embodiment of the invention.

FIG. 21A shows a user interface showing how a user may add an event manually in accordance with an embodiment of the invention. When the user clicks "Add Manual Event" a new line is added to the table at the end with the [x] button to remove it 14.0. The user then selects the type of captured event 14.1. The other fields dynamically update based on selection. The user can select form fields, selection by ID (HTML objects) or CSS expressions. Each manual entry requires an object identifier (the name of the form field, the ID or the CSS expression) and the attribute to capture (value is default for form field, innerHTML for div, etc.) As much as possible, intelligent defaults are used. FIG. 21B shows two user interfaces for required type and attribute of an event added manually according to an embodiment of the invention.

Figure 22:
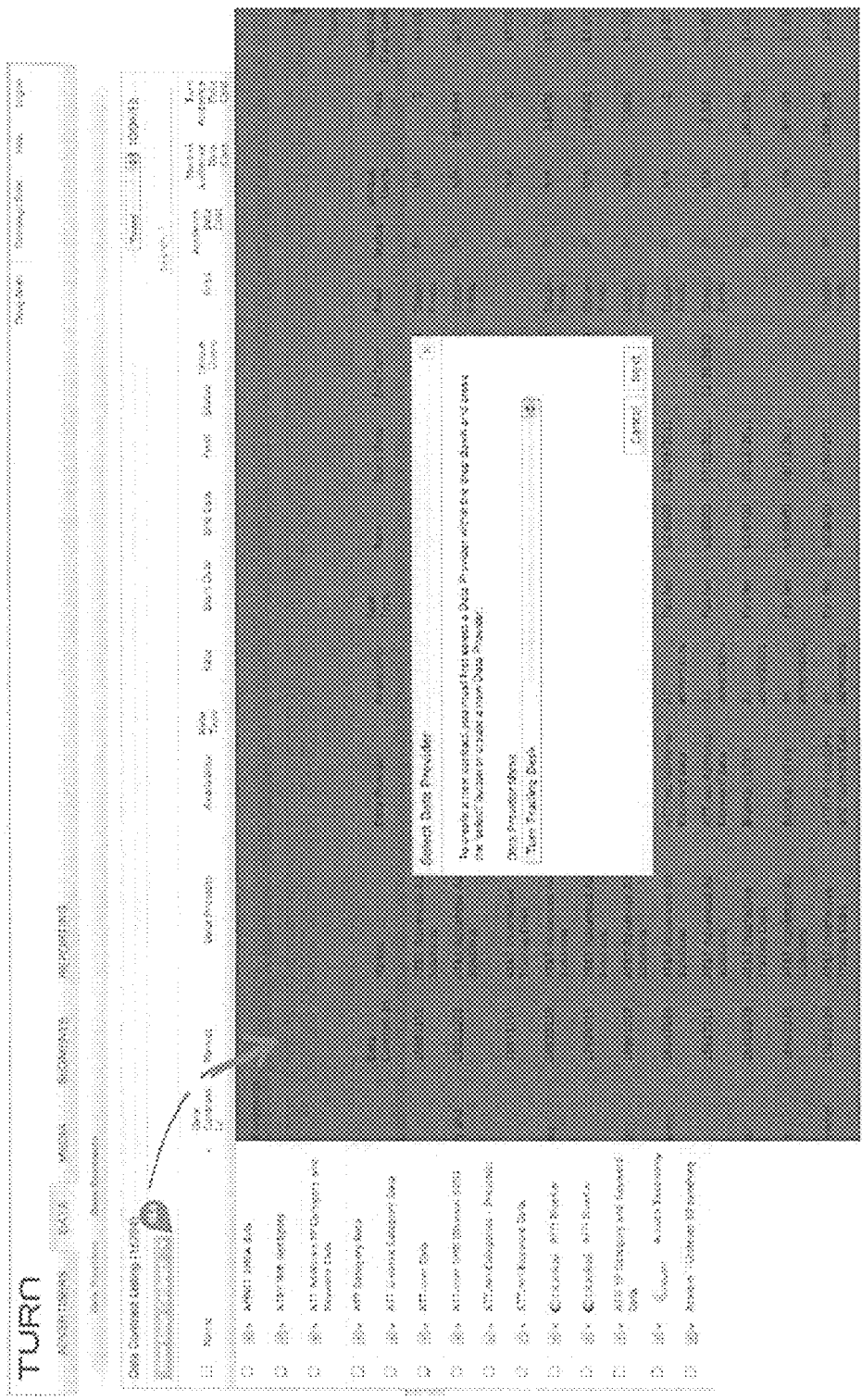
FIG. 22 shows a user interface for creating a new data contract according to an embodiment of the invention.

FIG. 22 shows a user interface for creating a new data contract in accordance with an embodiment of the invention. When the user clicks New Data Contract, the same workflow window as in regular Data Contracts is loaded 15.0. The provider is either Universal Tag or not.

Figure 23:
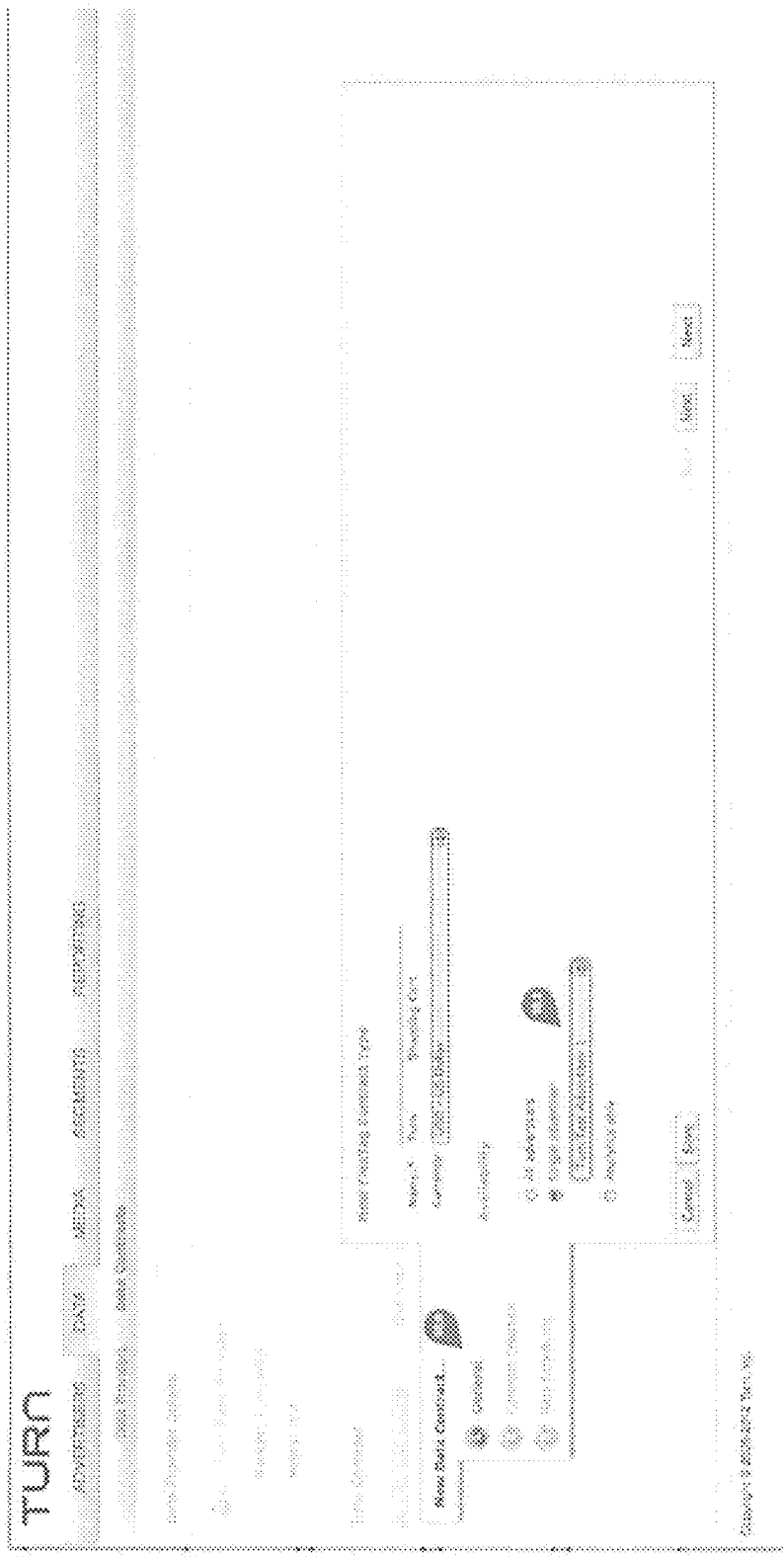
FIG. 23 shows a user interface having a general tab for contract creation in which a user enters the name, currency, and which advertisers according to an embodiment of the invention.

FIG. 23 shows a user interface showing the general tab for contract creation in which a user enters the name, currency, and which advertisers in accordance with an embodiment of the invention. The general tab in the contract creation flow is the same as regular data contract 16.0. The user may enter name, currency and which advertisers. The user selects single advertiser for many use cases including creation of a conversion event that is used in the campaign suite 16.1.

Figure 24A:
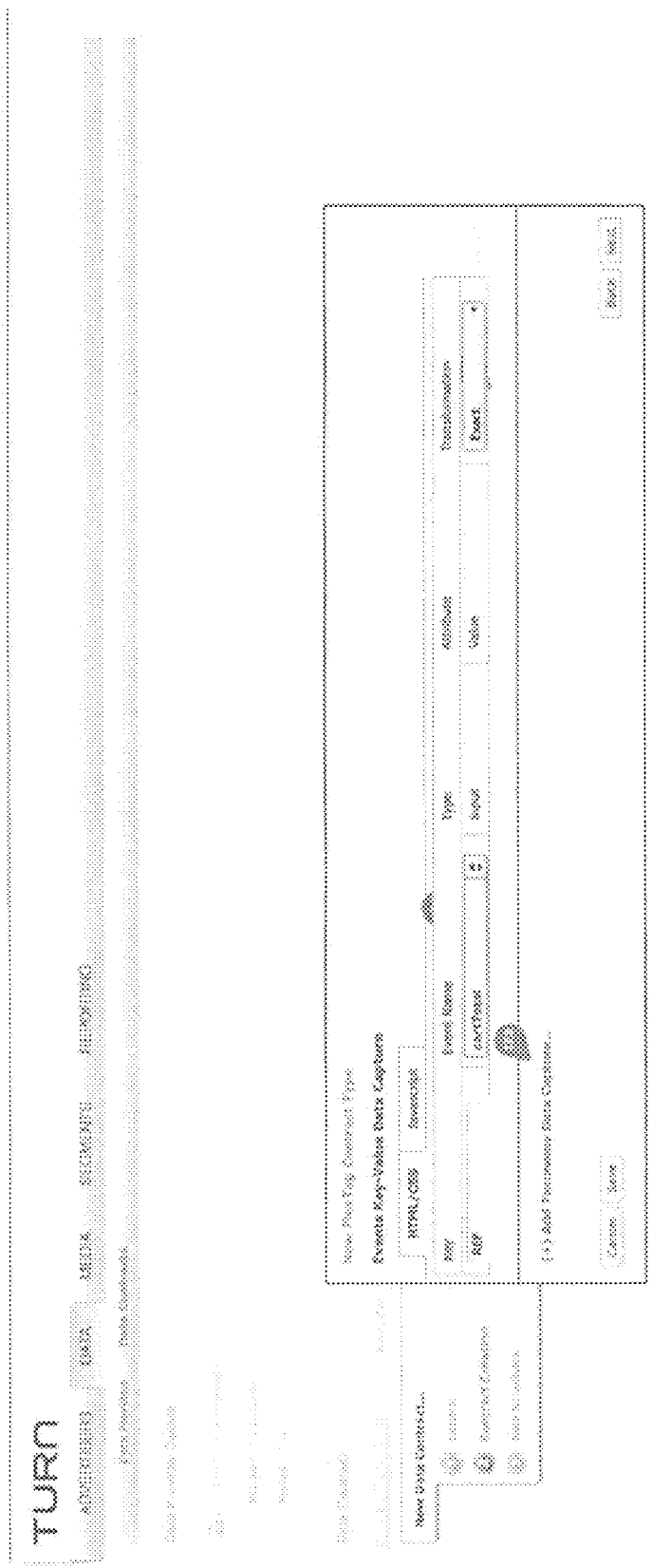
FIG. 24A shows a user interface having a list of previously entered events, which the user may browse according to an embodiment of the invention.
Figures 24B, 25B:
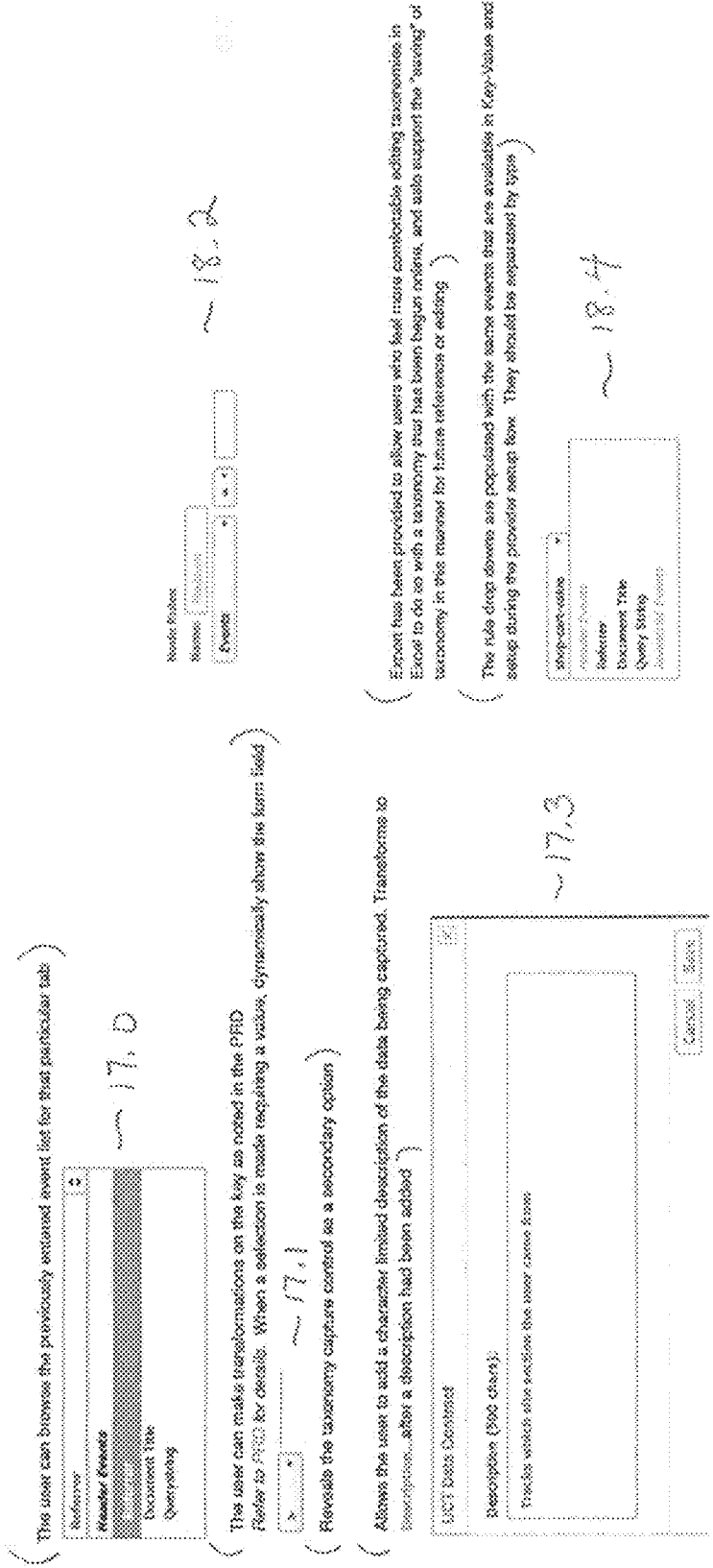
FIG. 24B shows user interfaces with which the user may browse detailed information for a particular event, how to make transformations on a particular key, and how to add text descriptions according to an embodiment of the invention.
FIG. 25B shows a user interface for creating node rules and a rule drop down populated with the same events that are available during the provider setup flow according to an embodiment of the invention.

FIG. 24A shows a user interface showing a list of previously entered events, which the user may browse according to an embodiment of the invention. FIG. 24B shows how, in a user interface, the user may browse detailed information for a particular event, how to make transformations on a particular key, and how to add text descriptions according to an embodiment of the invention. The user may browse the previously entered event list for that particular tab 17.0. The user may make transformations on the key 17.1. When a selection is made requiring a value, the form field is dynamically shown. A taxonomy capture control 17.2 as a secondary option is provided. 17.3 shows the user is allowed to add a character limited description of the data being captured.

Figure 25A:
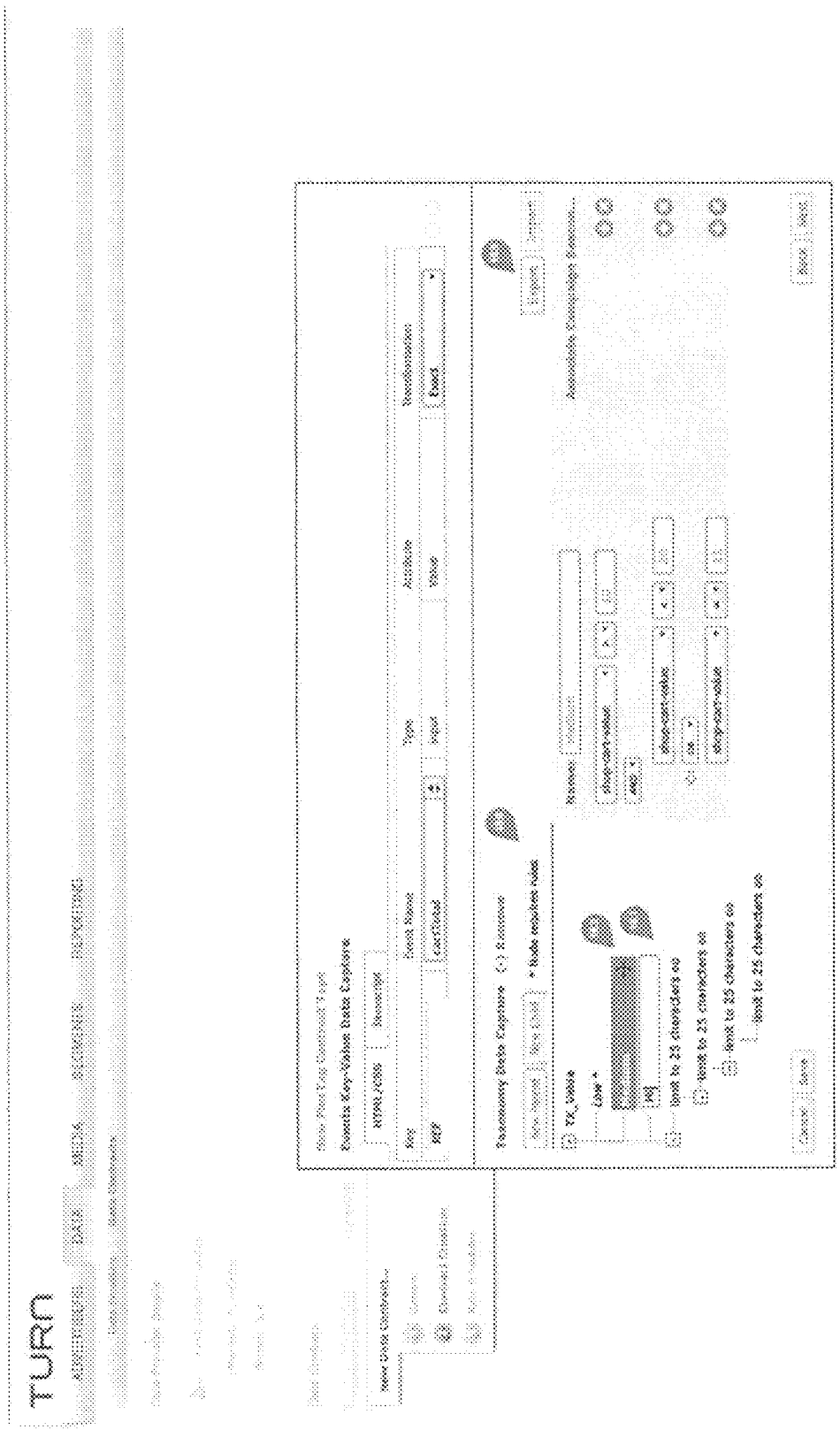
FIG. 25A shows a user interface with which new parent nodes and new child nodes can be set according to an embodiment of the invention.

FIG. 25A shows a user interface showing how to set new parent nodes and new child nodes according to an embodiment of the invention. FIG. 25B shows a user interface for creating node rules and a rule drop down populated with the same events that are available during the provider setup flow according to an embodiment of the invention. The user can quickly make a taxonomy set using the New Parent and New Child controls 18.0. When a child node is created, it requires rules and is denoted as such. When the user creates a new node, a form control is shown to accept text entry for name. 18.1. On Enter, the name is created. When the user selects a node, the rule set to the right is shown 18.2. The first drop down is populated with the events captured at the provider level. The operator can be set to equal by default or no setting. Export has been provided to allow users who feel more comfortable editing taxonomies in Excel to do so with a taxonomy that has been begun online, and also support the "saving" of taxonomy in this manner for future reference or editing 18.3. The rule drop downs are populated with the same events that are available in Key-Value and setup during the provider setup flow 18.4. They should be separated by type.

Figure 26A:
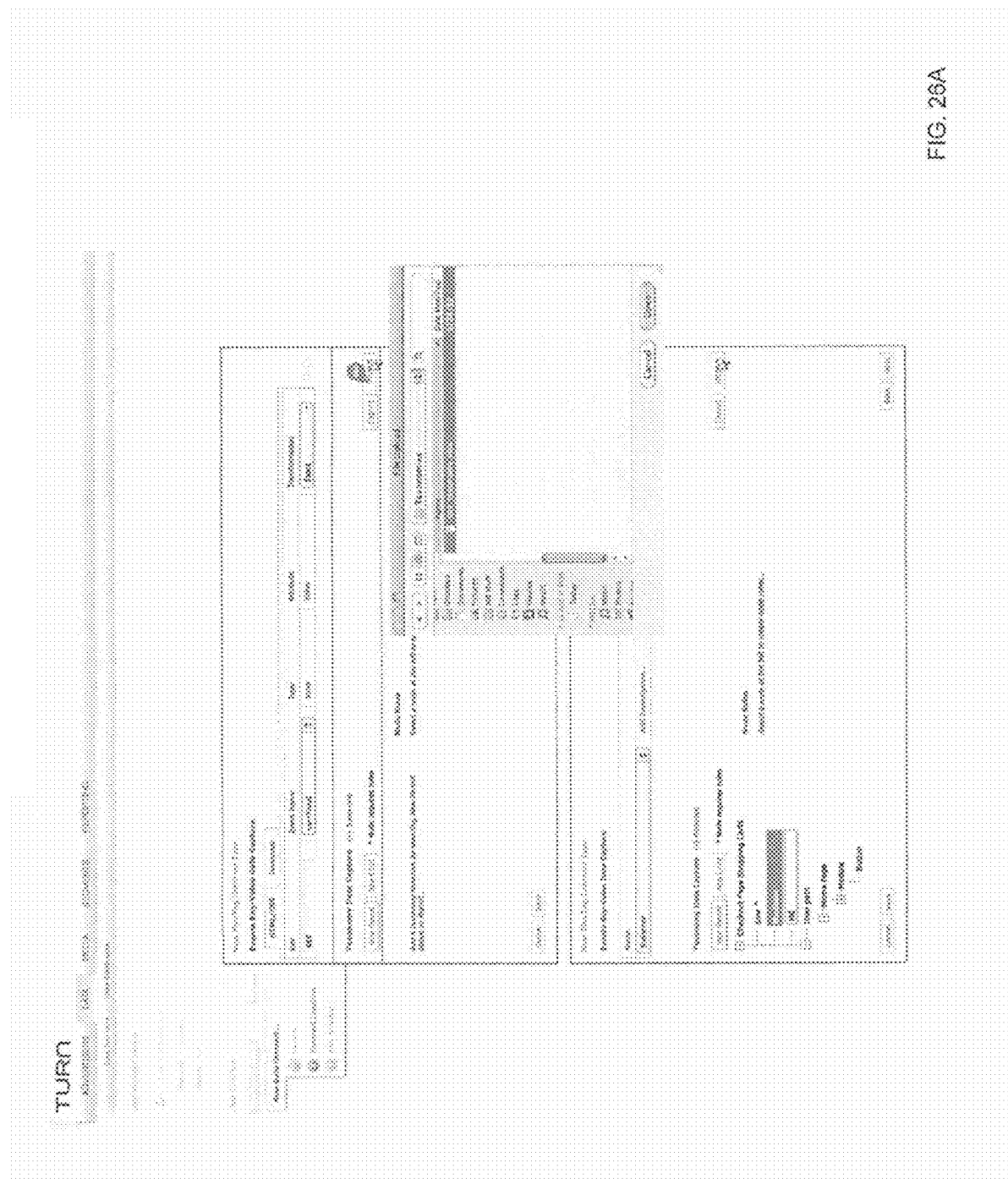
FIG. 26A shows a user interface in which a user may import a pre-existing taxonomy file according to an embodiment of the invention.

FIG. 26A shows a user interface showing a user may import a pre-existing taxonomy file in accordance with an embodiment of the invention. The user may import an xls or csv file using the standard import dialog 19.0.

Figure 26B:
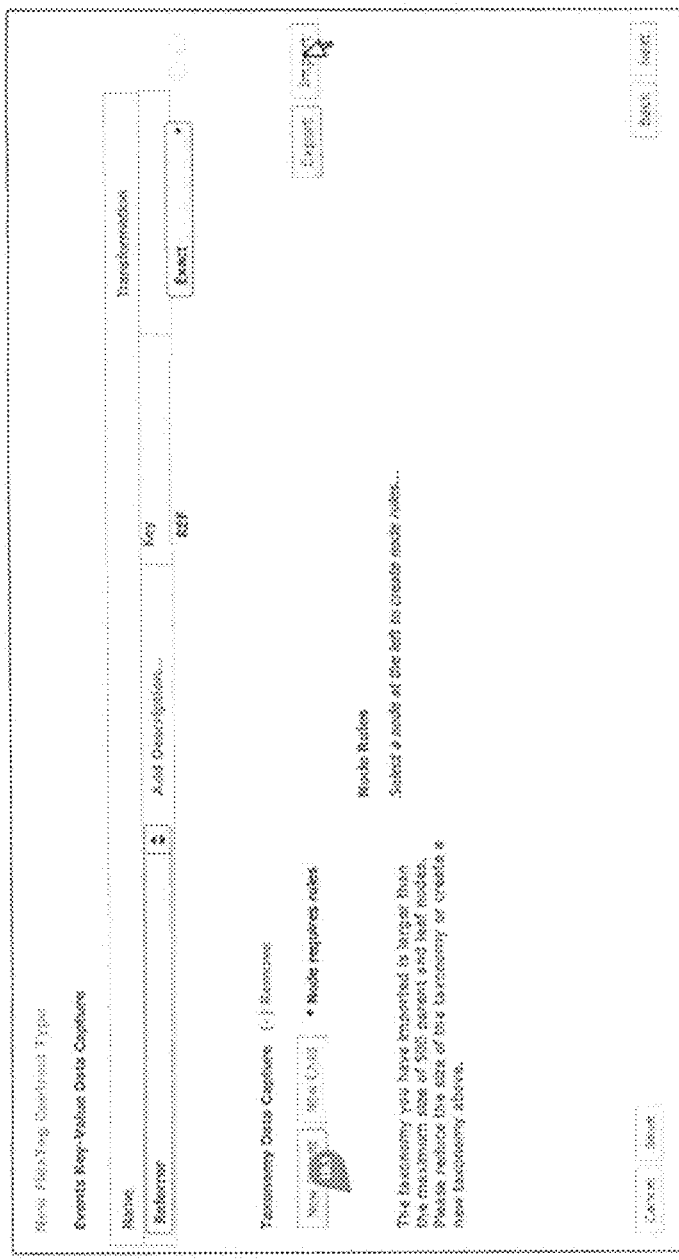
FIG. 26B shows a user interface in which a message is displayed when a taxonomy list is too large to import according to an embodiment of the invention.

FIG. 26B shows a user interface showing a message displayed when a taxonomy list is too large to import 19.1.

FIG. 27 shows four user interfaces showing variations on user-created groups by indenting rules in accordance with an embodiment of the invention. The rules have been separated from the taxonomy so as not to conflate these sometimes complex features. Adding new rules uses Boolean logic, even though the logic may be off in certain cases (especially AND cases) 2702. The user can then create a group by indenting, which then flips the Boolean. The indent button should only be active when there is a possible group (indent disabled with 1 rule or 2 rules, for example). The Boolean should default to OR, so that if the user "pre-creates" 4 rules, it initially makes logical sense. If in 2704 the cart value is 11.2, both the group rule and the 3rd rule are true, making the 3rd rule useless in this state. The user should not be able to "pre indent" rules or indent rules out of order. There may be interim states that may be illogical without validation 2706. In this case the 1st rule is useless when the cart value is 11.2. However, this again may be an interim state until the user creates a new group by indenting the rule 2708. The add button should add a blank rule below the currently clicked rule and within that rule's group. The user can then outdent if desired, but the logic should follow (flipping Boolean.) The delete button removes the selected rule and updates any group logic. If the user deletes one of two rules in a group, the group is then lost and the remaining rule outdents to the outer rule group, and takes on that rule group Boolean.

Figure 28:
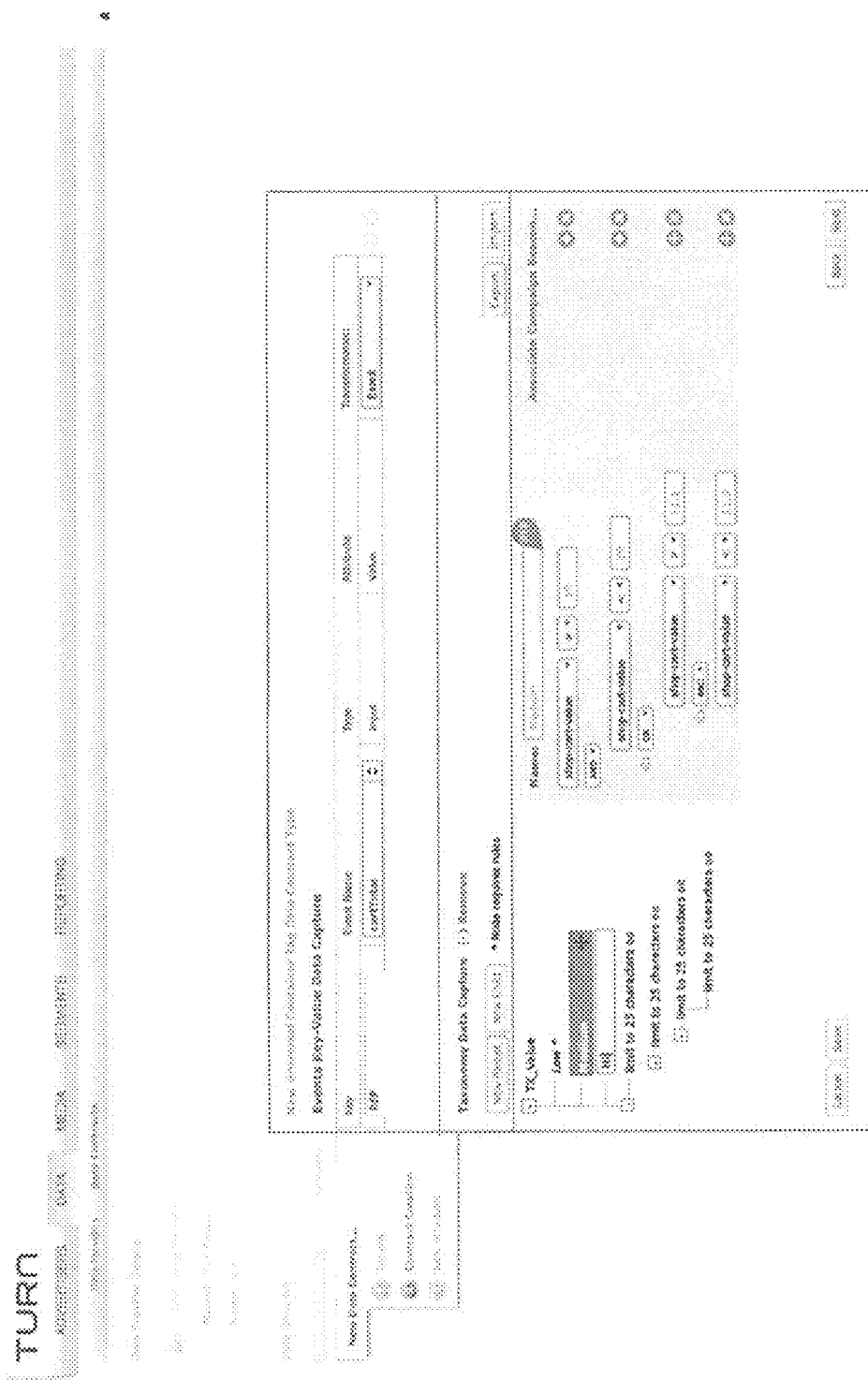
FIG. 28 shows a user interface the provides an example taxonomy and associated rules according to an embodiment of the invention.

FIG. 28 shows a user interface showing example taxonomy and associated rules in accordance with an embodiment of the invention. For example, one or more shop-cart-value categories can be created 21.0. In the new beacon example, the advertiser is JCPenney, the beacon type is Sale, the beacon name is shop_cart_value High, the action type is click and view through, the action cap is unlimited, the protocol is https, and options is selected by which the shopping cart total value is passed on to the campaign beacon.

Figure 29:
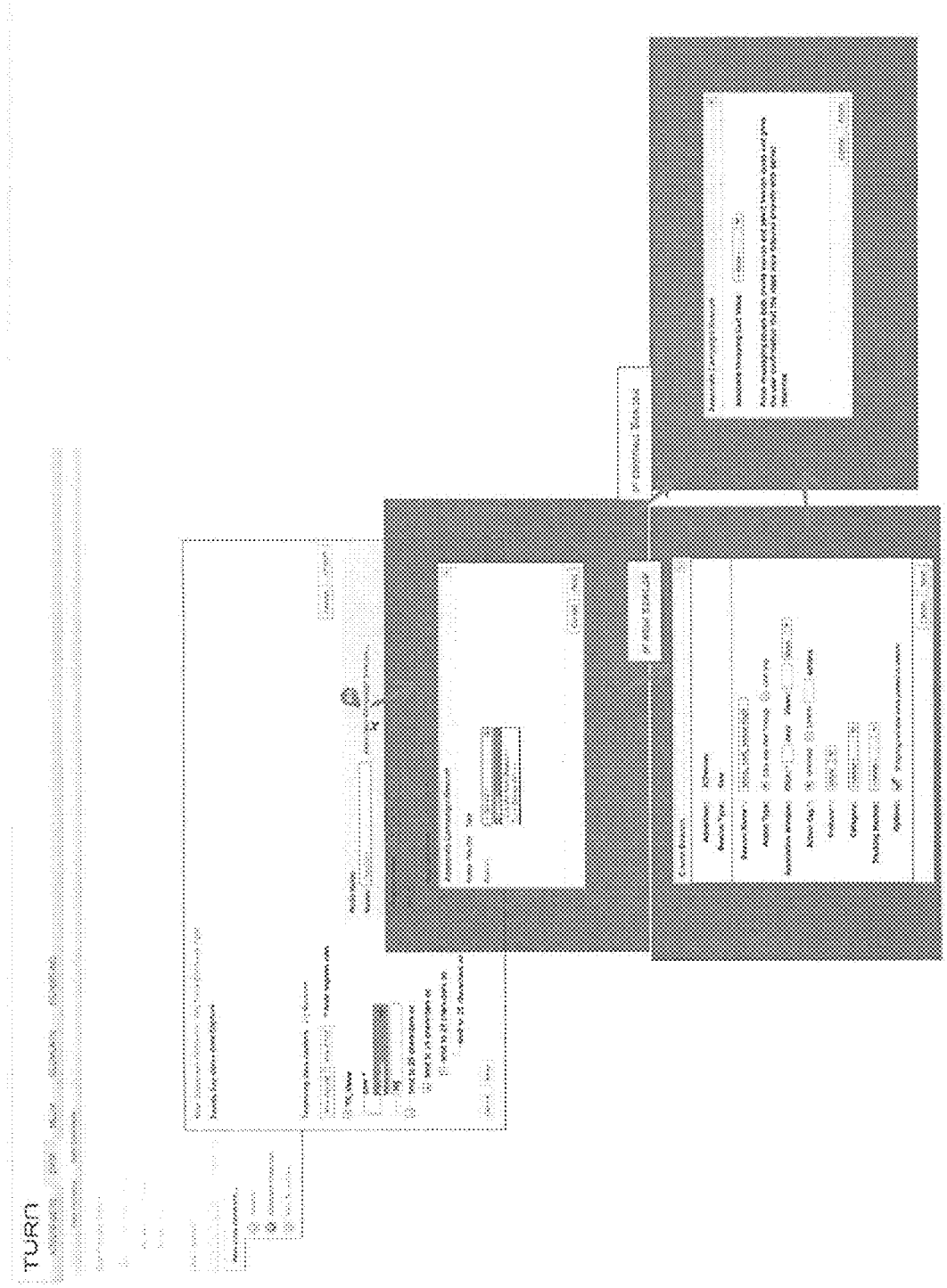
FIG. 29 shows a user interface in which a campaign beacon that is associated with a particular contract is created according to an embodiment of the invention.

FIG. 29 shows a user interface showing how a campaign beacon that is associated with a particular contract is created in accordance with an embodiment of the invention. The user can quickly make a taxonomy set using the New Parent and New Child controls 22.0. When a child node is created, it requires rules and is denoted as such.

Figure 30A:
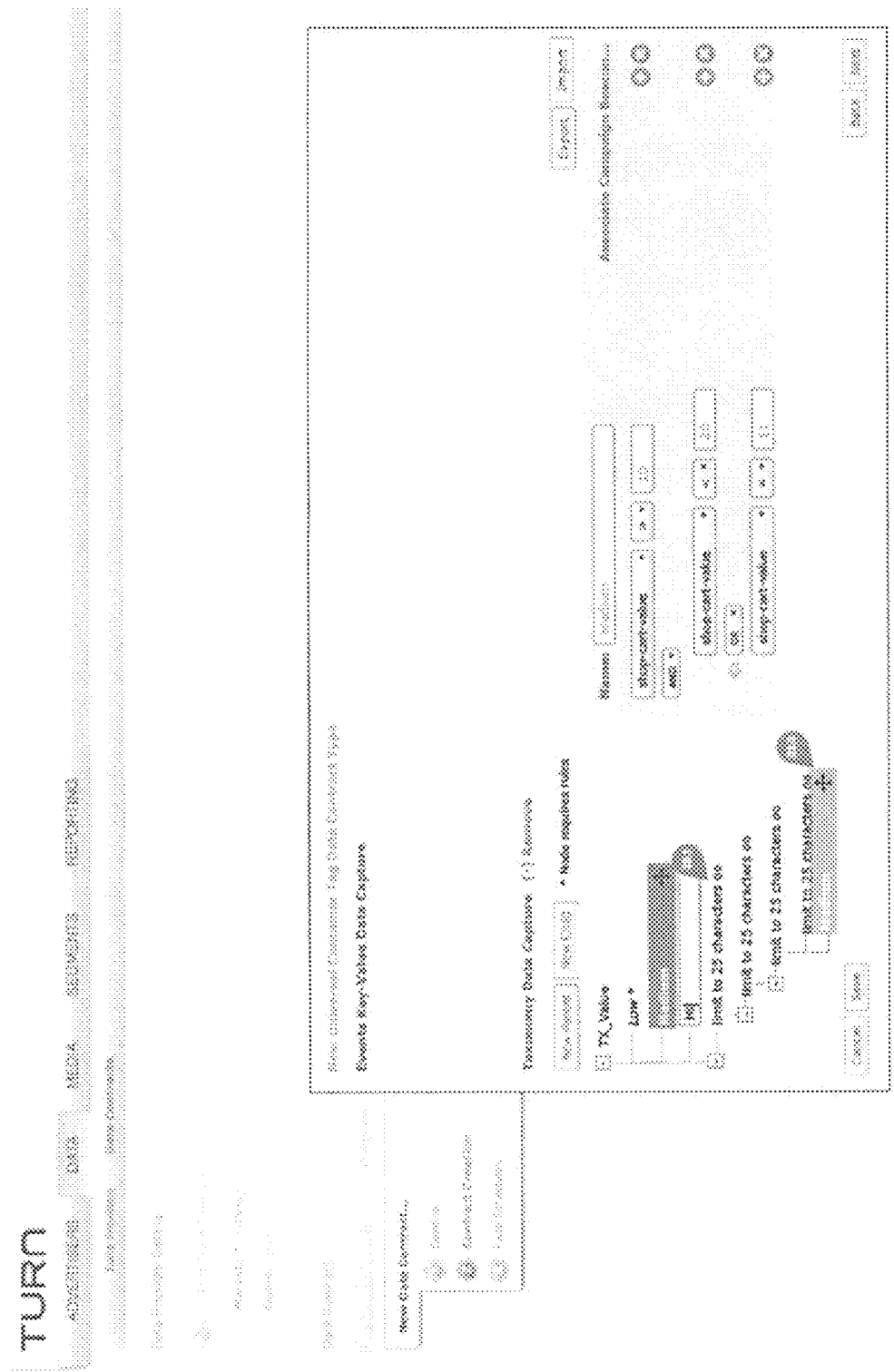
FIG. 30A shows a user interface in which a user may drag and drop a taxonomy node at any parent or child location according to an embodiment of the invention.

FIG. 30A shows a user interface showing how a user may drag and drop a taxonomy node at any parent or child location in accordance with an embodiment of the invention. The user can drag and drop the node using the grippy 23.0. The user can drop the node at any parent or child location and then tree control should create a temporary branch for the node. Because the order does not matter in the taxonomy itself, the child node can be inserted at the end. When the user drops the node to a parent level, the rules are lost 23.1. The console should warn using a modal dialog.

Figure 30B:
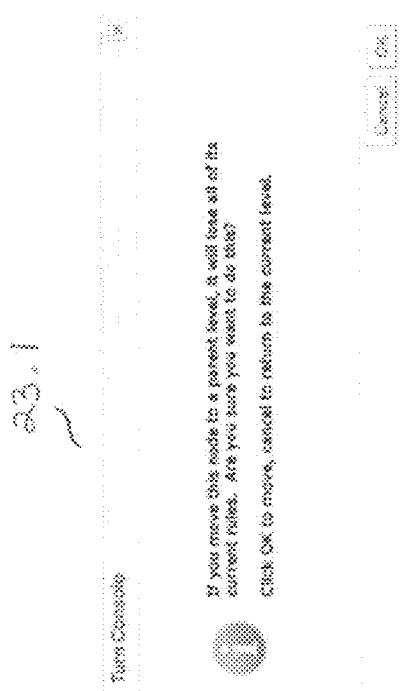
FIG. 30B shows a message box with a warning that if the user drops the node to a parent level, the corresponding rules are lost according to an embodiment of the invention.

FIG. 30B shows a message box with a warning that if the user drops the node to a parent level, the corresponding rules are lost according to an embodiment of the invention.

Figure 31:
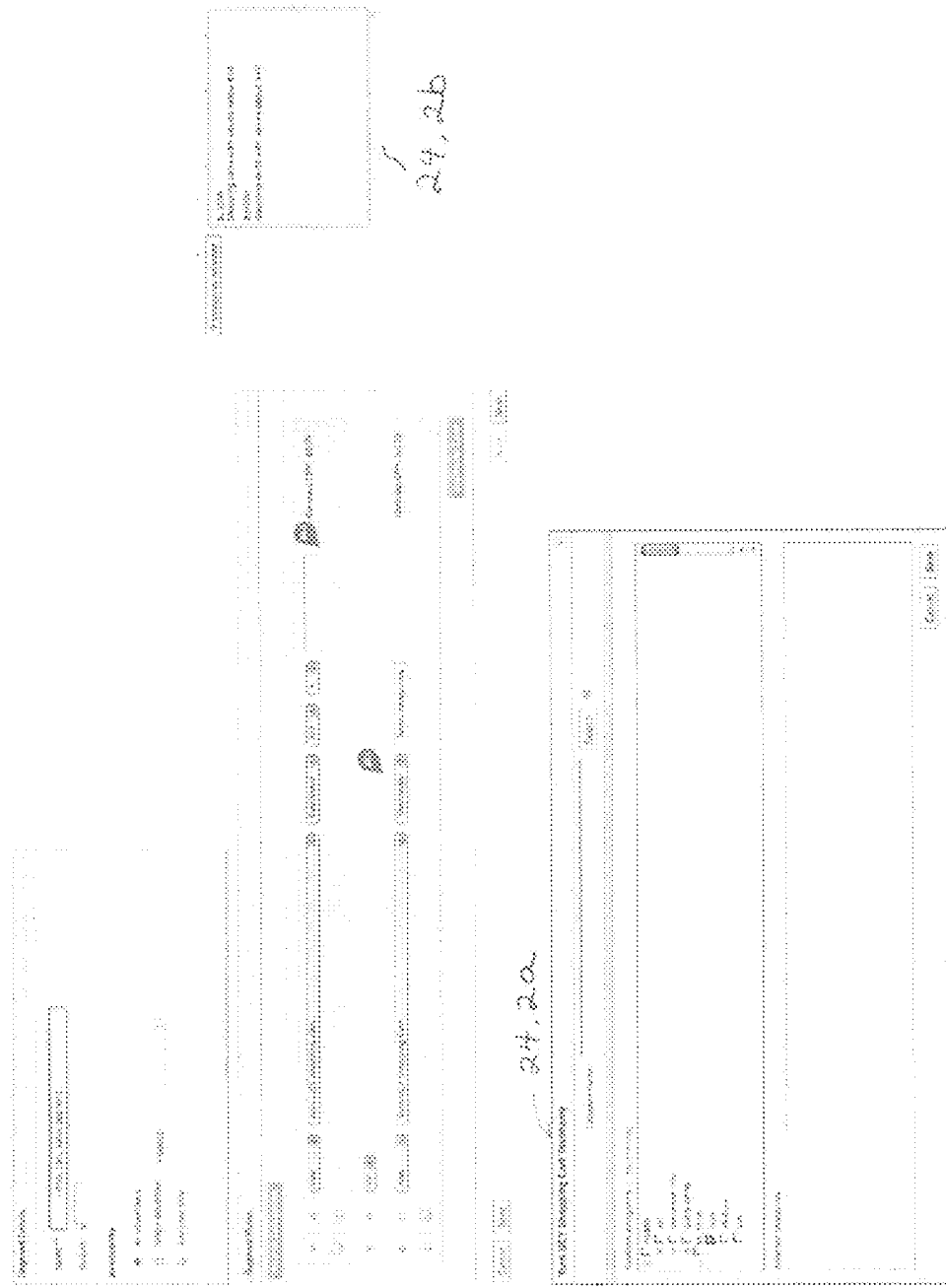
FIG. 31 shows user interfaces for building a shopping cart value segment according to an embodiment of the invention.

FIG. 31 shows a user interface showing a segment builder in accordance with an embodiment of the invention. A segment refers to a market segment, which is a particular group of consumers defined based on certain criteria for targeting purposes. For key/value data, the "Sample" link will write the first entry to the field to give the user a clue as to format (error prevention) 24.0. The selection for taxonomy data contracts should match the naming scheme used in the data contract stage 24.1. If it is shown as "Taxonomy" there, then use "Taxonomy" here rather than a different term. When the user selects "Select Categories" for Taxonomy based segments, the tree control is presented with the taxonomy 24.2. If nodes are selected the mouse-over behavior should show the description field for each node when implemented.

Figure 32:
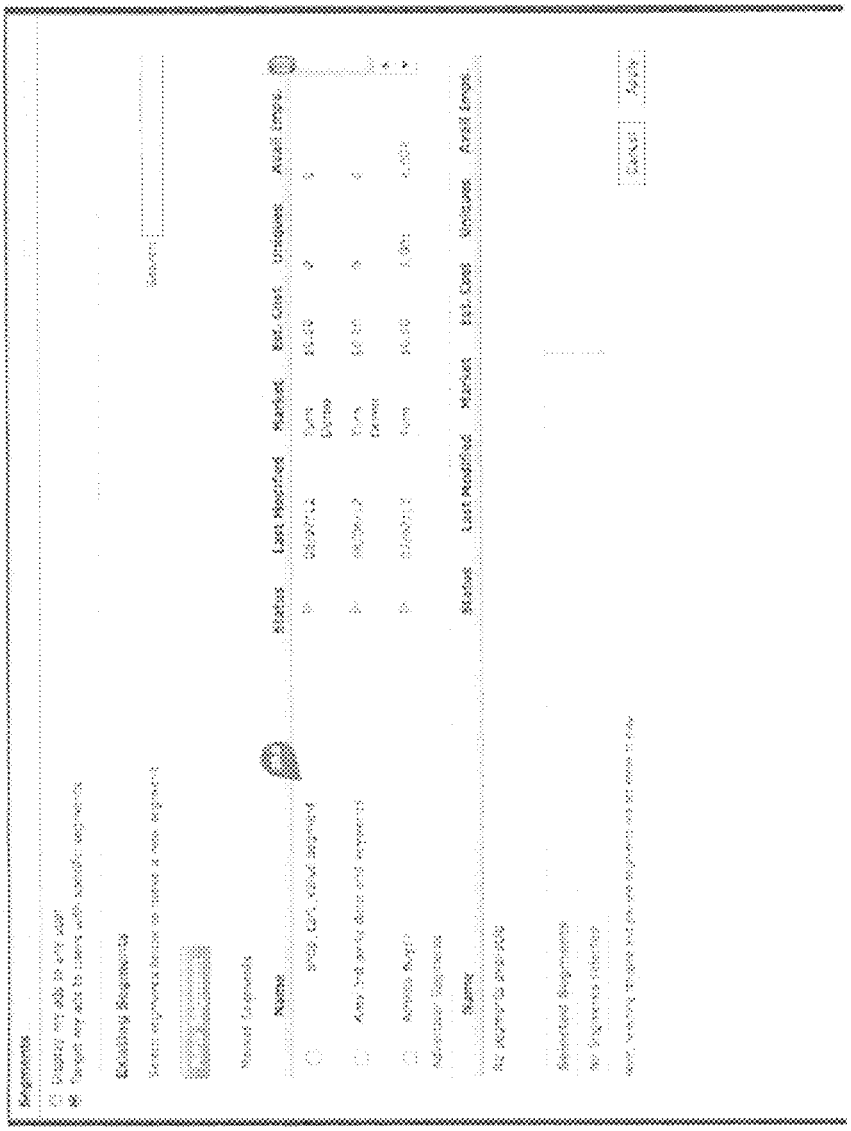
FIG. 32 shows a user interface for a user to target ads to consumers using particular segments according to an embodiment of the invention.

FIG. 32 shows a user interface for a user to target ads to consumers using particular market segments in accordance with an embodiment of the invention. When the user is running a campaign, the shopping cart value, e.g. high, created as a segment in audience may be used to target those consumers, to show appropriate marketing 25.0.

FIG. 33 shows user interfaces for creating a macro for an event for three different macro types in accordance with an embodiment of the invention. The types shown for illustrative purposes are DOM Text 3302; DOM Attribute 3304; and JavaScript Variable 3306.

An Example Machine Overview

FIG. 34 is a block schematic diagram of a system in the exemplary form of a computer system 3500 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 3500 includes a processor 3502, a main memory 3504 and a static memory 3506, which communicate with each other via a bus 3508. The computer system 3500 may further include a display unit 3510, for example, a liquid crystal display (LCD) or a cathode ray tube (CRT). The computer system 3500 also includes an alphanumeric input device 3512, for example, a keyboard; a cursor control device 3514, for example, a mouse; a disk drive unit 3516, a signal generation device 3518, for example, a speaker, and a network interface device 3520.

The disk drive unit 3516 includes a machine-readable medium 3524 on which is stored a set of executable instructions, i.e. software, 3526 embodying any one, or all, of the methodologies described herein below. The software 3526 is also shown to reside, completely or at least partially, within the main memory 3504 and/or within the processor 3502. The software 3526 may further be transmitted or received over a network 3528, 3530 by means of a network interface device 3520.

In contrast to the system 3500 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to obtain advertising analytics or universal tag management in accordance with embodiments herein on such internet-enabled or other network-enabled devices, servers, or clients. It further should be appreciated that one or more cloud computing embodiments may include providing or obtaining advertising analytics or performing universal tag management using mobile devices, tablets, and the like, as such devices are becoming standard consumer devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A system comprising:
 a universal tag configuration subsystem comprising:
  a console server operable to configure universal tags, each universal tag including a data contract definition for:
   specifying data events and corresponding event data to collect from a designated website accessed by a user at a user device, and
   specifying client-defined transformation rules and taxonomy rules for interpreting the collected event data to generate a user profile corresponding to the user, the user profile including key-value pairs and categorizations;
  wherein the data contract definition is stored as a corresponding updated data contract in a database; and
  a listening server operable to:
   identify the updated data contract in the database, and
   generate runtime code instructions based on the updated data contract; and
 a runtime subsystem comprising:
  a profile server for storing the user profile; and
  a presentation server operable to:
   receive the runtime code from the listening server to instantiate a runtime endpoint,
   collect, at runtime, event data from the designated website, the event data specified by the data contract definition,
   apply the transformations to the collected event data,
   categorize the transformed event data based on the applied taxonomy rules, and
   store the transformed event data in the corresponding user profile at the profile server;
  wherein collecting event data includes providing a universal tag script, via the presentation server, for running in the context of the designated website to instantiate a universal tag to:
   collect event data from the designated website, and
   report the collected event data to the runtime endpoint for applying the transformation and taxonomy rules; and
  wherein applying the transformations to the collected event data includes performing an iterative loop via the runtime endpoint on the presentation server, the iterative loop comprising:
   automatically determining, via a data provider servlet application, a list of runtime transformation applications corresponding to data contracts corresponding to a particular provider ID;
   performing, via a runtime transform application, the appropriate transformations on event-value pairs; and
   for each event-value pair, return a key-value pair and appropriate category identification for storage at a runtime user profile application.

2. The system of claim 1, wherein the configuration subsystem is configured to provide:
   a console user interface (UI) at the console server for creating and managing the universal tags, and
   an event inspector tool on the listening server for defining context-specific data events for collection on a webpage visited by a user device.

3. The system of claim 2, wherein the event inspector defines context-specific data events in a format other than HyperText Markup Language.

4. The system of claim 2, wherein data events are automatically defined at the console server via the event inspector tool.

5. The system of claim 1, wherein collecting event data further includes:
   gathering, via the presentation server, the contract definitions corresponding to a given provider identification;
   transmitting the contract definitions to a client device to instantiate the universal tag, the universal tag including a universal tag reporter, wherein the universal tag reporter resolves event expressions at the client device and collects the evaluated event data; and
   receiving, at the presentation server, the key-value list of event names and values along with provider identification and user identification corresponding to the collected event data.

6. The system of claim 1, wherein the universal tag includes an expression evaluator comprising:
   a JavScript interpreter communicating with a window application program interface (API), and
   a document object model (DOM) element value interpreter communicating with a DOM API of the window API.

7. The system of claim 5, wherein storing the transformed event data in the corresponding one or more user profiles with the transformed event data at the profile server includes updating the one or more user profiles via the runtime endpoint.

8. A method comprising:
   configuring a data contract definition of a universal tag via a console server, wherein the data contract definition specifies:
      data events and corresponding event data to collect from a designated website accessed by a user at a user device, and
      client-defined transformation rules and taxonomy rules for interpreting the collected event data to generate a user profile corresponding to the user, the user profile including key-value pairs and categorizations;
   storing the data contract definition as a corresponding updated data contract in a database;
   identifying, via a listening server, the updated data contract in the database;
   generating, via the listening server, run time code instructions based on the updated data contract;
   receiving, at a presentation server, the runtime code from the listening server to instantiate a runtime endpoint at the presentation server;
   collecting, at the presentation server during runtime, event data from the designated website, the event data specified by the data contract definition;
   applying the transformations to the collected event data, categorizing the transformed event data based on the applied taxonomy rules, and
   storing the transformed event data in the corresponding user profile at a profile server;
   wherein collecting event data includes providing a universal tag script, via the presentation server, for running in the context of the designated website to instantiate a universal tag to:
      collect event data from the designated website, and
      report the collected event data to the runtime endpoint for applying the transformation and taxonomy rules; and
   wherein applying the transformations to the collected event data includes performing an iterative loop via the runtime endpoint on the presentation server, the iterative loop comprising:
      automatically determining, via a data provider servlet application, a list of runtime transformation applications corresponding to data contracts corresponding to a particular provider ID;
      performing, via a runtime transform application, the appropriate transformations on event-value pairs; and
      for each event-value pair, return a key-value pair and appropriate category identification for storage at a runtime user profile application.

9. The method of claim 8, further comprising:
   generating a console user interface (UI) at the console server for inputting the client-defined transformation rules and taxonomy rules, and
   generating an event inspector tool on the listening server for defining context-specific data events for collection on a webpage visited by a user device.

10. The method of claim 9, wherein the event inspector defines context-specific data events in a format other than HyperText Markup Language.

11. The method of claim 9, wherein data events are automatically defined at the console server via the event inspector tool.

12. The method of claim 8, wherein collecting event data further includes:
   gathering, via the presentation server, the contract definitions corresponding to a given provider identification;
   transmitting the contract definitions to a client device to instantiate the universal tag, the universal tag including a universal tag reporter, wherein the universal tag reporter resolves event expressions at the client device and collects the evaluated event data; and
   receiving, at the presentation server, the key-value list of event names and values along with provider identification and user identification corresponding to the collected event data.

13. The method of claim 8, wherein the universal tag includes an expression evaluator comprising:
   a JavScript interpreter communicating with a window application program interface (API), and
   a document object model (DOM) element value interpreter communicating with a DOM API of the window API.

14. The method of claim 12, wherein storing the transformed event data in the corresponding one or more user profiles with the transformed event data at the profile server includes updating the one or more user profiles via the runtime endpoint.

15. A non-transitory computer readable medium storing one or more programs configured for execution by a computer, the one or more programs comprising instructions for:
   configuring a data contract definition of a universal tag via a console server, wherein the data contract definition specifies:

data events and corresponding event data to collect from a designated website accessed by a user at a user device, and client-defined transformation rules and taxonomy rules for interpreting the collected event data to generate a user profile corresponding to the user, the user profile including key-value pairs and categorizations;

storing the data contract definition as a corresponding updated data contract in a database;

identifying, via a listening server, the updated data contract in the database;

generating, via the listening server, run time code instructions based on the updated data contract;

receiving, at a presentation server, the runtime code from the listening server to instantiate a runtime endpoint at the presentation server;

collecting, at the presentation server during runtime, event data from the designated website, the event data specified by the data contract definition;

applying the transformations to the collected event data, categorizing the transformed event data based on the applied taxonomy rules, and storing the transformed event data in the corresponding user profile at a profile server;

wherein collecting event data includes providing a universal tag script, via the presentation server, for running in the context of the designated web site to instantiate a universal tag to:

collect event data from the designated website, and report the collected event data to the runtime endpoint for applying the transformation and taxonomy rules; and wherein applying the transformations to the collected event data includes performing an iterative loop via the runtime endpoint on the presentation server, the iterative loop comprising:

automatically determining, via a data provider servlet application, a list of runtime transformation applications corresponding to data contracts corresponding to a particular provider ID;

performing, via a runtime transform application, the appropriate transformations on event-value pairs; and for each event-value pair, return a key-value pair and appropriate category identification for storage at a runtime user profile application.

16. The non-transitory computer readable medium of claim 15, wherein collecting event data includes providing a universal tag script, via the presentation server, for running in the context of the designated website to instantiate a universal tag to:

collect event data from the designated website, and report the collected event data to the runtime endpoint for applying the transformation and taxonomy rules.

\* \* \* \* \*